(12) United States Patent
Ishihara et al.

(10) Patent No.: US 6,560,631 B1
(45) Date of Patent: May 6, 2003

(54) DATA ANALYSIS IN DISTRIBUTED DATA PROCESSING SYSTEM

(75) Inventors: Yasuhide Ishihara, Kawasaki (JP); Hiroshi Yanaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/266,866

(22) Filed: Mar. 12, 1999

(30) Foreign Application Priority Data

Mar. 17, 1998 (JP) .......................................... 10-066549

(51) Int. Cl.[7] .............................................. G06F 15/16
(52) U.S. Cl. ...................... 709/201; 709/102; 709/104; 709/105; 709/217
(58) Field of Search ........................ 707/4–10; 709/100, 709/104, 105, 201, 202, 303, 217, 102

(56) References Cited

U.S. PATENT DOCUMENTS

| | | | | |
|---|---|---|---|---|
| 4,805,134 A | * | 2/1989 | Calo et al. ...................... 707/10 |
| 4,920,483 A | * | 4/1990 | Pogue et al. ................. 711/219 |
| 5,442,791 A | * | 8/1995 | Wrabetz et al. ............. 709/202 |
| 5,479,477 A | * | 12/1995 | McVey et al. ................. 455/17 |
| 5,481,668 A | * | 1/1996 | Marcus ...................... 395/349 |
| 5,592,671 A | * | 1/1997 | Hirayama ................... 709/104 |
| 5,649,184 A | * | 7/1997 | Hayashi et al. ................ 707/8 |
| 5,659,547 A | * | 8/1997 | Scarr et al. ..................... 714/4 |
| 5,706,501 A | * | 1/1998 | Horikiri et al. ................ 707/10 |
| 5,884,077 A | * | 3/1999 | Suzuki ........................ 709/105 |
| 6,081,826 A | * | 6/2000 | Masuoka et al. ........... 709/100 |
| 6,195,678 B1 | * | 2/2001 | Komuro ..................... 709/202 |
| 6,223,205 B1 | * | 4/2001 | Harchol-Balter et al. ... 709/105 |

OTHER PUBLICATIONS

Coulouris et al., "Distributed Systems, Concepts and Design", Addison–Wesely Publishers, 1994.*

* cited by examiner

*Primary Examiner*—Nabil El-Hady
(74) *Attorney, Agent, or Firm*—Staas & Halsey LLP

(57) ABSTRACT

A distributed data processing system uniformly managing distributed data and program files. A resource management database associates identifiers of resource files to be used in analytical processes with their respective storage locations. The identifiers should be unique in the distributed environment, so that all resource files will be uniquely distinguished from each other by using their identifiers. When requesting execution of a particular analytical process, the identifiers specify resource files necessary for the process. A process execution unit in the system first creates a work area, which can also be used to store intermediate data files created during the execution. The resource management database is consulted to know the locations of necessary resource files, and creates links in the work area to reach those files. The process execution unit executes the requested analytical process while making access to the resource files via the links in the work area.

2 Claims, 22 Drawing Sheets

141 ANALYTICAL PROCEDURE SCRIPT

```
cube specification
# name            = M16.nakamoto.dash.cube
# status          = DSave
# owner           = nakamoto
# group           = dash
# create_date     = 19980219170851
# permission      = rwxrwxrwx
# abstract        =
# obe             =
# filter          =
# frame           =
# current_step    = 4
# row_num         = 3
# irow_ind        =
# step_num        = 5
# engine_num      = 5
# imagedata_name  = M16.nakamoto.dash.f4-2-0

engine specification
# engine_name0    = EclipseBiasCreate.pub.pub.engine -in IN -out OUT -param -M 200
# engine_attr0    = Create N 1
# engine_name1    = EclipseBiasApply.pub.pub.engine -in IN -out OUT -apply APPLY -param - -M 200
# engine_attr1    = Apply 1 N
# engine_name2    = EclipseFlatCreate1.pub.pub.engine -in IN -out OUT -param -m -M 200
# engine_attr2    = Create N 1
# engine_name3    = EclipseFlatApply.pub.pub.engine -in IN -out OUT -apply APPLY -param / -M 200
# engine_attr3    = Apply 1 N
                    .
                    .
                    .
```

FIG. 6

141 ANALYTICAL PROCEDURE SCRIPT

```
data flag
# flag0-0        = 1 1 1 1 1 1 1 1
# flag0-1        = 0 0 0 0 0 0
# flag0-2        = 0
# flag1-0        = 2
# flag1-1        = 1 1 1 1 1 1
                    .
                    .
                    .

data name
# cfn0-0         = kcc34057.dash.dash kcc34115.dash.dash kcc34114.das
h.dash kcc34083.dash.dash kcc34094.dash.dash kcc34098.dash.dash kcc34089
.dash.dash kcc34039.dash.dash kcc34087.dash.dash
# cfn0-1         = kcc34101.dash.dash kcc34105.dash.dash kcc34109.das
h.dash kcc34113.dash.dash kcc34092.dash.dash kcc34106.dash.dash
# cfn0-2         = kcc34064.dash.dash
# cfn1-0         = f1-0-0
# cfn1-1         = kcc34101.dash.dash kcc34105.dash.dash kcc34109.das
h.dash kcc34113.dash.dash kcc34092.dash.dash kcc34106.dash.dash
                    .
                    .
                    .

cube log
# log0           = start 19980221124202.250 0 1
# log1           = 0 0.04 Warehouse::sobcp NA EclipseBiasCreate.pub.p
ub.engine -in kcc34057.dash.dash kcc34115.dash.dash kcc34114.dash.dash k
cc34083.dash.dash kcc34094.dash.dash kcc34098.dash.dash kcc34089.dash.da
sh kcc34039.dash.dash kcc34087.dash.dash -out f1-0-0 -param -M 200
# log2           = end 19980221124202.402
# log3           = start 19980221134528.869 0 1
# log4           = 0 0.01 Warehouse::sobcp NA EclipseBiasCreate.pub.p
ub.engine -in kcc34057.dash.dash kcc34115.dash.dash kcc34114.dash.dash k
cc34083.dash.dash kcc34094.dash.dash kcc34098.dash.dash kcc34089.dash.da
sh kcc34039.dash.dash kcc34087.dash.dash -out f1-0-0 -param -M 200
                    .
                    .
                    .
```

FIG. 7

172aa  ANALYTICAL PROCEDURE MANAGEMENT TABLE

| name | abstract | owner | group | create_date | imagedata_name | obe | frame | permission | Warehouse_name | datatype |
|---|---|---|---|---|---|---|---|---|---|---|
| M15.nakamoto.dash.cube | dummy1 | dash1 | dash | 19970716000000 | NULL | FOCUS | Obj | rwxr-xr-x | Warehouse::sobs | PROCEDURE |
| M42.nakamoto.dash.cube | dummy2 | dash1 | dash | 19970716000000 | M15.nakamoto.dash.f6-4-0 | FOCUS | Bias | r-xr-xr-x | Warehouse::sobs | PROCEDURE |
| M1.nakamoto.dash.cube | dummy3 | dash1 | dash | 19970731000000 | NULL | FOCUS | Obj | rwxr-xr-x | Warehouse::sobs | PROCEDURE |
| M2.nakamoto.dash.cube | dummy3 | dash1 | dash | 19970731000000 | NULL | FOCUS | Obj | rwxr-xr-x | Warehouse::sobs | PROCEDURE |
| NGC1000.nakamoto.dash.cube | dummy4 | dash1 | dash | 19970731000000 | NULL | FOCUS | Obj | rwxr-xr-x | Warehouse::sobs | PROCEDURE |
| NGC1771.nakamoto.dash.cube | dummy4 | dash1 | dash | 19970731000000 | NULL | FOCUS | Obj | rwxr-xr-x | Warehouse::sobs | PROCEDURE |
| M45.nakamoto.dash.cube | dummy4 | dash1 | dash | 19970731000000 | NULL | FOCUS | Obj | rwxr-xr-x | Warehouse::sobs | PROCEDURE |
| M9.nakamoto.dash.cube | NULL | dash1 | dash | 19970815120222 | sun09:dash1.c000006.f10-5-0 | NULL | NULL | rwx------ | Warehouse::sobs | PROCEDURE |
| M11.nakamoto.dash.cube | NULL | dash1 | dash | 19970815131222 | sun09:dash1.c000007.f6-4-0 | NULL | NULL | rwx------ | Warehouse::sobs | PROCEDURE |
| CISCO.nakamoto.dash.cube | PROCube for CISCO | dash1 | dash | 19970815131222 | sun09:dash1.c000007.f6-4-0 | NULL | NULL | rwxrwxrwx | Warehouse::sobs | PROCEDURE |

FIG.9

172ab PROCESSING ENGINE MANAGEMENT TABLE

| name | abstract | arg | owner | group | create_date | permission | warehouse_name | datatype |
|---|---|---|---|---|---|---|---|---|
| CreateMult ipleN | dummy data for testing Cube Editor | -in IN -out OUT -param -M 50 | test | fjt | 97/08/18 | rwxr-xr-x | Warehouse: :sobs | ENGINE |
| CreateMult iple3 | dummy data for testing Cube Editor | -in IN -out OUT -param -M 50 | test | fjt | 97/08/18 | rwxr-xr-x | Warehouse: :sobs | ENGINE |
| EclipseBias Apply | Bias std. calib apply, alias for EngEcArith.pl | -in IN -apply APPLY -out OUT -param / -M 50 | ishihara | fjt | 97/08/18 | rwxr-xr-x | Warehouse: :sobs | ENGINE |
| EclipseBias Create | Bias std. calib create, alias for EngEcAverage.pl | -in IN -out OUT -param -M 50 | ishihara | fjt | 97/08/18 | rwxr-xr-x | Warehouse: :sobs | ENGINE |
| EclipseFlat Apply | Flat std. calib apply, alias for EngEcArith.pl | -in IN -apply APPLY -out OUT -param / -M 50 | ishihara | fjt | 97/08/18 | rwxr-xr-x | Warehouse: :sobs | ENGINE |
| EclipseFlat Create1 | Flat std. calib create, alias for EngEcAverage.pl | -in IN -out OUT -param -m -M 50 | ishihara | fjt | 97/08/18 | rwxr-xr-x | Warehouse: :sobs | ENGINE |
| EclipseFlat Create2 | Flat std. calib create, alias for EngEcNorm.pl | -in IN -out OUT -param -m mean -M 50 | ishihara | fjt | 97/08/18 | rwxr-xr-x | Warehouse: :sobs | ENGINE |

FIG.10

172ac SOURCE DATA MANAGEMENT TABLE

| name | abstract | frame | owner | group | create_date | procube_name | permission | Warehouse_name | datatype |
|---|---|---|---|---|---|---|---|---|---|
| M15.nakamoto.dash | NULL | NULL | dash1 | dash | 19970815172404 | M15.nakamoto.dash.cube | rwx------ | Warehouse::sobs | IMAGEDATA |
| M42.nakamoto.dash | NULL | NULL | dash1 | dash | 19970815004109 | M42.nakamoto.dash.cube | rwx------ | Warehouse::sobs | IMAGEDATA |
| M1.nakamoto.dash | NAOJdata | Obj | public | public | 19970818000000 | M1.nakamoto.dash.cube | r--r--r-- | Warehouse::sobs | IMAGEDATA |
| M42.nakamoto.dash | NAOJdata | Obj | public | public | 19970818000000 | M42.nakamoto.dash.cube | r--r--r-- | Warehouse::sobs | IMAGEDATA |
| M9.nakamoto.dash | NAOJdata | Obj | public | public | 19970818000000 | M9.nakamoto.dash.cube | r--r--r-- | Warehouse::sobs | IMAGEDATA |
| M11.nakamoto.dash | NAOJdata | Obj | public | public | 19970818000000 | M11.nakamoto.dash.cube | r--r--r-- | Warehouse::sobs | IMAGEDATA |

FIG.11

181c WAREHOUSE DATA MANAGEMENT TABLE

| status | name | abstract | owner | group | permission | create_date | last_access_time | caching_time | path | arg | obe | frame |
|---|---|---|---|---|---|---|---|---|---|---|---|---|
| engine | DashCopy.pub.pub.engine | 980217/test | pub | pub | r-xr-xr-x | 19980217153000 | 19980217153000 | NULL | /work1/engine/DashCopy.pub.pub.engine | #NAME? | NULL | NULL |
| engine | EclipseBiasApply.pub.pub.engine | Bias std. calib apply, alias for EngEcArith.pl | pub | pub | r-xr-xr-x | 19980217153000 | 19980217153000 | NULL | /work1/engine/EclipseBiasApply.pub.pub.engine | -in IN -apply APPLY -out OUT -param - -M 200 | NULL | NULL |
| engine | EclipseBiasCreate.pub.pub.engine | Bias std. calib create, alias for EngEcAverage.pl | pub | pub | r-xr-xr-x | 19980217153000 | 19980217153000 | NULL | /work1/engine/EclipseBiasCreate.pub.pub.engine | -in IN -out OUT -param - -M 200 | NULL | NULL |
| . . | . . | . . | . . | . . | . . | . . | . . | . . | . . | . . | . . | . . |
| image | kcc34038.dash.dash | NAOJdata | dash | dash | rw- | 19980217153000 | 19980217153000 | NULL | /work1/image/kcc/kcc34038.dash.dash | NULL | KCC | Obj |
| image | kcc34039.dash.dash | NAOJdata | dash | dash | r-- | 19980217153000 | 19980217153000 | NULL | /work1/image/kcc/kcc34039.dash.dash | NULL | KCC | Bias |
| Image | kcc34040.dash.dash | NAOJdata | dash | dash | r-- | 19980217153000 | 19980217153000 | NULL | /work1/image/kcc/kcc34040.dash.dash | NULL | KCC | Obj |
| . . | . . | . . | . . | . . | . . | . . | . . | . . | . . | . . | . . | . . |
| Procedure | M15.dash02.dash.cube | dummy1 | dash02 | dash | rwx- | 19980217180000 | 19980217180000 | NULL | /work1/cube/M15.dash02.dash.cube | NULL | FOCUS | Obj |
| Procedure | M17.nakamoto.dash.cube | Execution Test | nakamoto | dash | rwx- | 19980217180000 | 19980217180000 | NULL | /work1/cube/M17.nakamoto.dash.cube | NULL | FOCUS | Obj |
| Procedure | M42.dash02.dash.cube | dummy2 | dash02 | dash | r-- | 19980217180000 | 19980217180000 | NULL | /work1/cube/M42.dash02.dash.cube | NULL | FOCUS | Bias |
| . . | . . | . . | . . | . . | . . | . . | . . | . . | . . | . . | . . | . . |

FIG.13

181d  WAREHOUSE STATUS TABLE

| TIME | AVAILABLE WORK AREA | USAGE RATIO | CPU LOAD | NETWORK LOAD |
|---|---|---|---|---|
| 98/02/22 10:10 | 10000GB | 50% | 20% | 10% |
| 98/02/22 10:20 | 10000GB | 40% | 40% | 40% |
| 98/02/22 10:30 | 10000GB | 60% | 40% | 20% |
| 98/02/22 10:40 | 10000GB | 70% | 100% | 30% |
| 98/02/22 10:50 | 10000GB | 50% | 20% | 10% |

FIG.14

DATA ANALYSIS IN DISTRIBUTED DATA PROCESSING SYSTEM

BACKGROUND OF THE INVENTION

1. Field of the Invention

The present invention relates to a distributed data processing system and a computer-readable medium storing a computer program for distributed processing. More particularly, the present invention relates to a distributed data processing system in which a plurality of processors perform a data analysis in a distributed manner, and also to a computer-readable medium storing a computer program to realize such a distributed data processing system.

2. Description of the Related Art

In the fields of science and technology, researchers routinely use computers to analyze a large amount of experimental or observational data, as well as applying appropriate calibration processes to them. Most research institutions have their own computer centers, in which many processors are interconnected by high-performance network facilities to form a distributed computing environment. Researchers in such institutions make preparatory arrangements when executing a particular analytical process. That is, they define a procedure of analysis and enter a list of source data files, result data files, and processing engines (i.e., computer programs for the analysis). In conventional systems, those data files and program files should be specified by using their names and full path names, according to the file system being used.

However, conventional file systems sometimes require the users to designate necessary resource files in different ways from computer to computer, because actual system configurations of computers may not always be the same. This means that the portability of resource files is not guaranteed in such conventional distributed computing environments. Suppose, for instance, that one researcher has performed a data analysis on one computer, with an analytical procedure script written for that computer, and he/she now attempts to run a similar data analysis on another computer. The problem is that it may not be possible for him/her to use the same analytical procedure script in the new computer. If this is the case, then he/she must rewrite the script (e.g., change the designation of source data files and other files) so that it will be suitable for a different file system environment.

Consider another problem situation where some processing engines are missing in a computer being used and it is unable to continue the analysis. Still another possible situation is that the computer's magnetic disk unit cannot provide enough space to store all data files required. In such cases, it is necessary to transfer the present analytical procedure script and related resource files to another computer that is available in the distributed system. However, it is extremely difficult to seamlessly continue the analysis on different computing platforms, because of the lack of data portability.

Furthermore, in conventional distributed environments, management of resource files is left to individual researchers' discretion, meaning that files can be transferred or copied freely within a computer or among different computers. In other words, uniqueness of each file is not always maintained in the system. This results in multiple instances of data or program files that have been unnecessarily replicated and accumulated in the same machine, just wasting invaluable computer resources.

Again, researchers should handle various resource files, including source image data files, intermediate data files, result data files, and analytical procedure scripts. They often use their individual work spaces or temporary storage area in a computer to store or manage such resource files. This situation, however, could cause a problem when they attempt to manage such dispersed files. Besides wasting computers' storage resources, the presence of duplicated files could also cause a serious confusion when a user tries to delete unnecessary intermediate data or other files. Therefore, it has been desired to develop a safe and easy method to manage data and program files for analyses.

SUMMARY OF THE INVENTION

Taking the above into consideration, an object of the present invention is to provide a distributed data processing system having a capability to manage distributed data and program files in a unified fashion.

To accomplish the above object, according to the present invention, there is provided a distributed data processing system for analyzing data with a plurality of computers in a distributed environment. This system comprises a management database storage unit and a process execution unit. The management database storage unit stores a resource management database that associates identifiers of resource files used in analytical processes with actual storage locations of those resource files. Here, the identifiers should be unique in the distributed environment, so that all resource files will be uniquely identified thereby. The process execution unit is responsive to a process execution request for a specific analytical process, where necessary resources are specified with their identifiers. When such a process execution request is received, it executes the requested analytical process by using the resources whose locations are retrieved from the resource management database in the management database storage unit.

The above and other objects, features and advantages of the present invention will become apparent from the following description when taken in conjunction with the accompanying drawings which illustrate a preferred embodiment of the present invention by way of example.

BRIEF DESCRIPTION OF THE DRAWINGS

FIGS. 6 and 7 are diagrams which show an example of an analytical procedure script;

FIG. 9 is a diagram which shows an example of an analytical procedure management table;

FIG. 10 is a diagram which shows an example of a processing engine management table;

FIG. 11 is a diagram which shows an example of a source data management table;

FIG. 13 is a diagram which shows an example of a warehouse data management table;

FIG. 14 is a diagram which shows an example of a warehouse status table;

DESCRIPTION OF THE PREFERRED EMBODIMENTS

Embodiments of the present invention will be described below with reference to the accompanying drawings.

Figure 1:
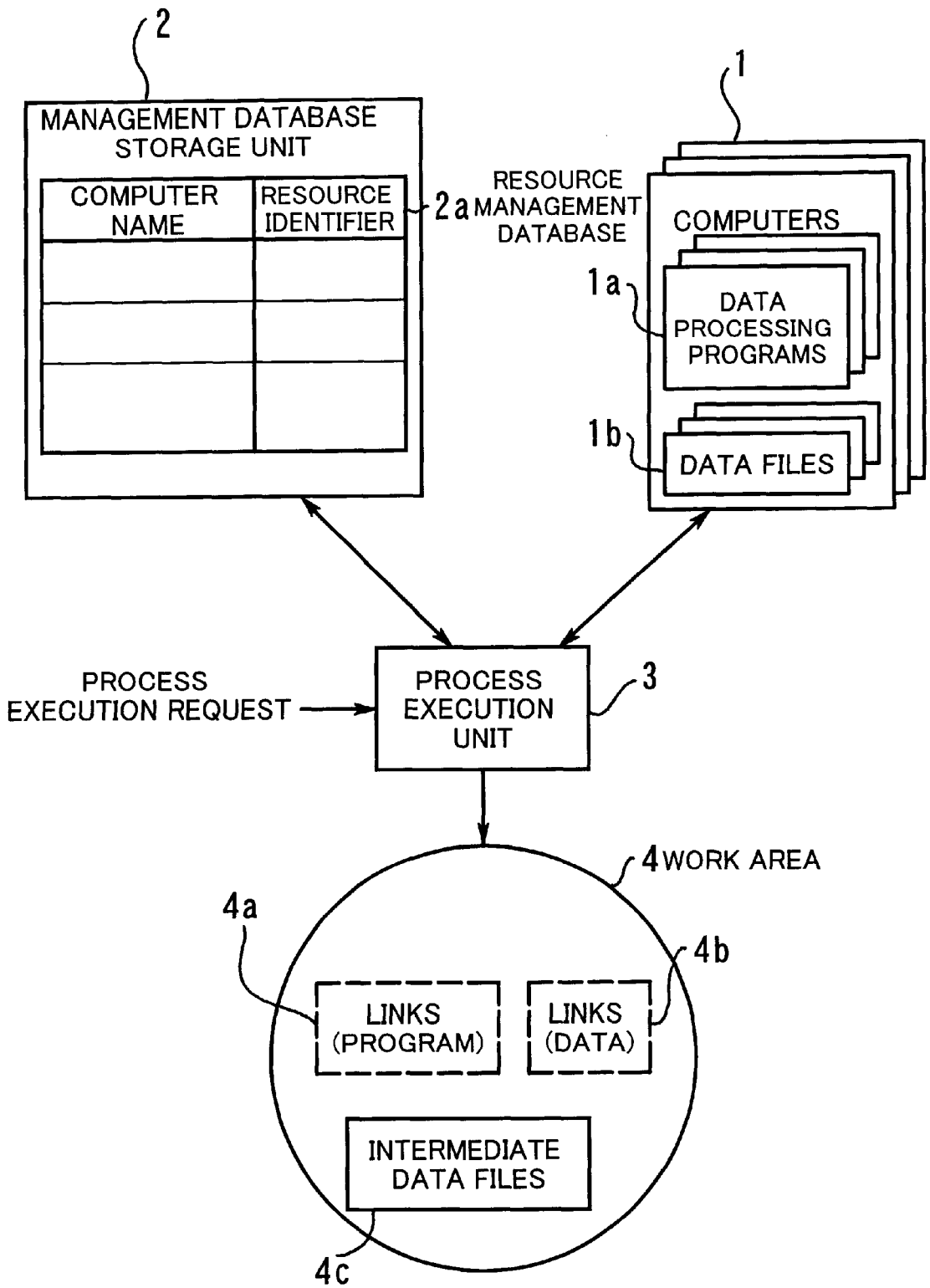
FIG. 1 is a conceptual view of the present invention.

FIG. 1 is a conceptual view of a distributed data processing system according to the present invention. To analyze a given set of source data, this system employs a plurality of computers 1, each of which has a plurality of data processing programs 1a and data files 1b. A management database storage unit 2 holds a resource management database 2a, whose registered records indicate the storage locations of program and data files required in data analyses. More specifically, one column of the resource management database 2a shown in FIG. 1 is labeled "RESOURCE IDENTIFIER." This column is used to store the identifiers, or names, of resource files that have been assigned beforehand in such a way that the files will be uniquely identifiable in the system. Here, the term "resource files" collectively refers to data and program files to be used in data analyses, including: the data processing programs 1a and data files 1b, and analytical procedure scripts (not explicitly shown in FIG. 1, but considered to be included in the data files 1b). The storage locations of those resource files are found in another column of the resource management database 2a, which has a label that reads "COMPUTER NAME."

To execute a particular analytical process, a request command specifying its corresponding resource file names should be issued to a process execution unit 3. This command is shown as "PROCESS EXECUTION REQUEST" in FIG. 1. Upon receipt of this request command, the process execution unit 3 first creates a work area 4 for use in the requested analytical process. It then consults the resource management database 2a in the management database storage unit 2 to find the location of necessary data and program files, and creates links 4a and 4b to reach those files. These links 4a and 4b reside in the work area 4 and serve as reference pointers to relevant program and data files. Note here that the work area 4 does not hold any substantial contents of those program or data files. The process execution unit 3 then executes the requested analytical process, making access to the program and data files via the links 4a and 4b in the work area 4. It may produce some temporary files, or intermediate data files 4c, during the process. Unlike the data processing programs 1a or data files 1b, those intermediate data files 4c are created in the work area 4.

One of the important features of the above-described distributed data processing system is that unique resource file names are assigned to individual resource files in the system as their identifiers. This feature permits the user to command the process execution unit 3 to execute his/her desired data analysis by entering a process execution request that designates specific resource file names, without the need to know the actual locations of those resource files. Accordingly, the same request command can be used to execute the analysis no matter which computer is selected as the computing platform.

In addition, the process execution unit 3 creates a work area 4 for each session of data analysis, and concentrates all relating data elements in this work area 4. Because dedicated work areas are provided for different data analyses and no correlation can happen among them, it is possible to remove a work area pertaining to a particular data analysis conducted in the past, without affecting any other active processes that are running in the system. By doing this, the user can delete all unnecessary data easily and safely.

Now, the next section will describe a celestial observation system as a specific embodiment of the present invention.

Figure 2:
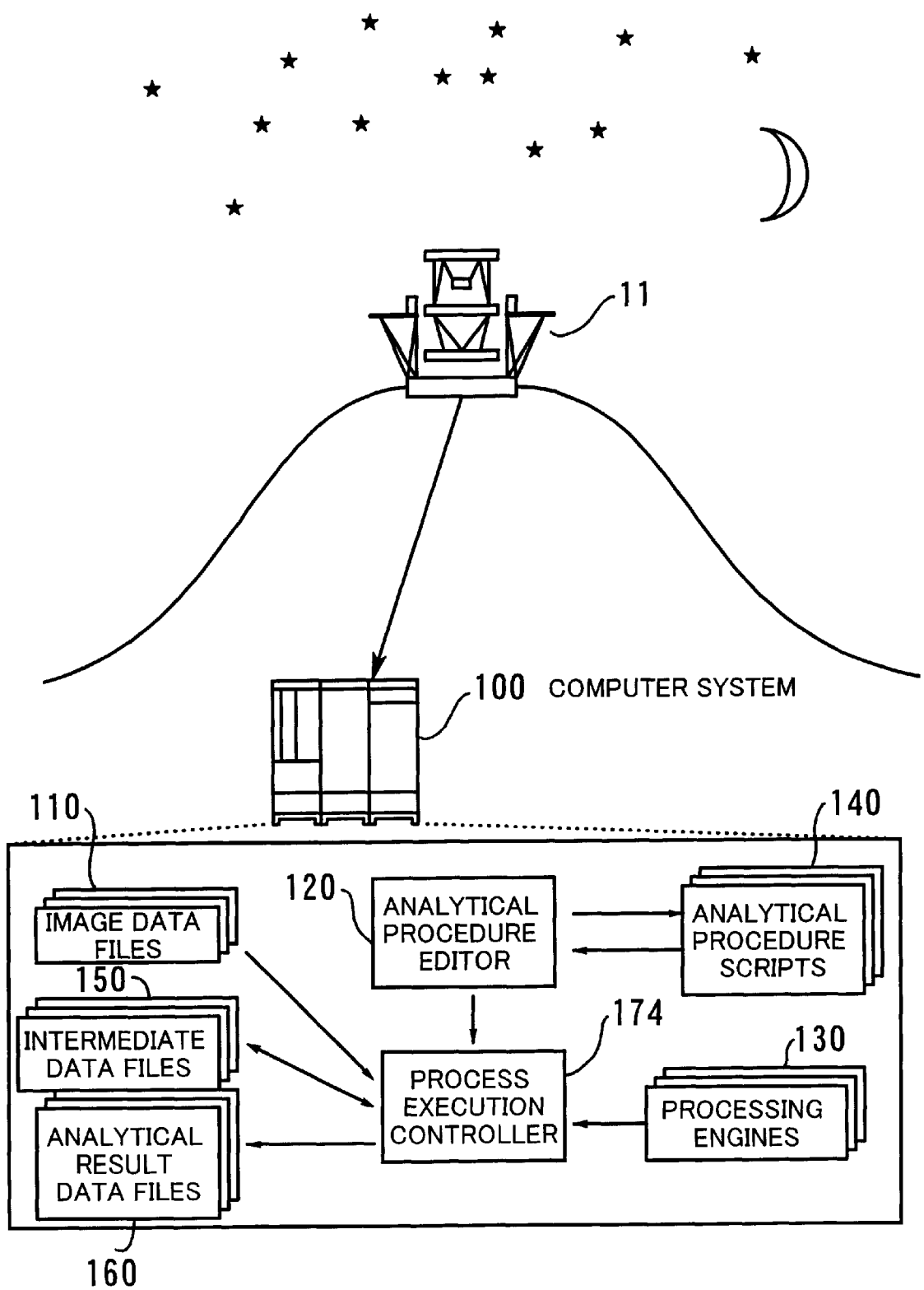
FIG. 2 is a diagram which shows a celestial observation system.

FIG. 2 shows a celestial observation system according to the present invention. An astronomical telescope 11, situated at the summit of a mountain, is equipped with image sensors such as Charge Coupled Devices (CCDs) to capture the images of celestial objects including stars and planets. This astronomical telescope 11 is linked to a remote computer system 100 located at the foot of the mountain. This communication link delivers the captured object images from the astronomical telescope 11 to the computer system 100.

Image data files 110 supplied from the telescope 11 are stored in the computer system 100's local storage for use as source data for analyses or raw source data for producing standard calibration data. A user sitting at a terminal station (not shown) enters some appropriate instructions to an analytical procedure editor 120. In response to his/her instructions, the analytical procedure editor 120 produces analytical procedure scripts 140, or sends a process execution command to a process execution controller 174. Each analytical procedure script 140 contains the detailed specifications of an analytical process, which include:

in what sequence the analysis should be executed, which data processing engines (data processing programs) 130 should be used, which image data files 110 are to be subjected to the analysis, what intermediate data files 150 are to be produced, and what analytical result data files 160 are to be obtained, where data processing engines 130 are computer programs prepared for various steps of analytical processes.

The analytical procedure editor 120 issues a process execution command to the process execution controller 174, specifying what source data files and analytical procedure script should be used for the requested analytical process. Upon receipt of this command, the execution controller 174 fetches relevant data processing engines 130 and image data files 110. It then executes the requested analytical process as specified in the analytical procedure script, thereby yielding analytical result data files 160, together with intermediate data files 150.

Figure 3:
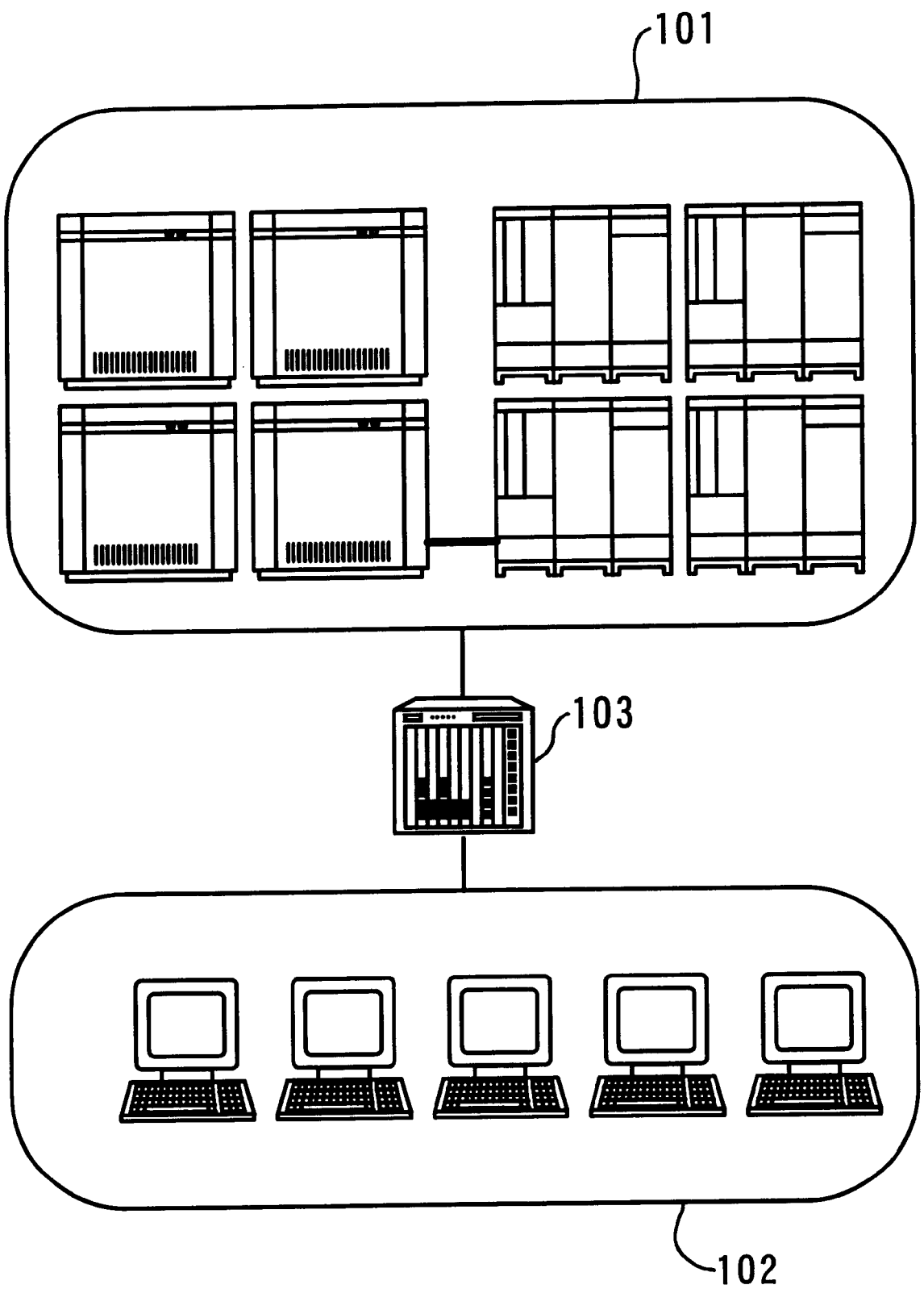
FIG. 3 is a diagram which shows a typical structure of a computer system.

FIG. 3 shows a specific structure of the computer system 100. The computer system 100 comprises a plurality of computers 101, which may be vector processors, scalar processors, or other types of processors. A plurality of terminal stations 102 are connected to those computers 101 via high-speed network facilities 103. Workstations and personal computers serve as the terminal stations 102. Users can remotely operate the astronomical telescope 11 and/or analyze observation data by entering appropriate commands to the system through their terminal stations 102.

Since this kind of celestial observation systems generally need extremely high computing power, they are often equipped with tens of processors. In such a multiprocessor environment, the image data files 110, intermediate data files 150, data processing engines 130 and other computing resources are distributed over the plurality of processors.

The following section will now focus on the internal sequence of an analytical process, as well as the contents of an analytical procedure script that describes the sequence. As an example of an analytical process, a data calibration sequence will be discussed below. Note that "observation data files" and "raw calibration source data files" appearing in the next discussion are what have been referred to as the image data files 110, while the outcomes of some processes (e.g., "calibration processes" or "standard data creating processes") are what have been called the intermediate data 150.

Figure 4:
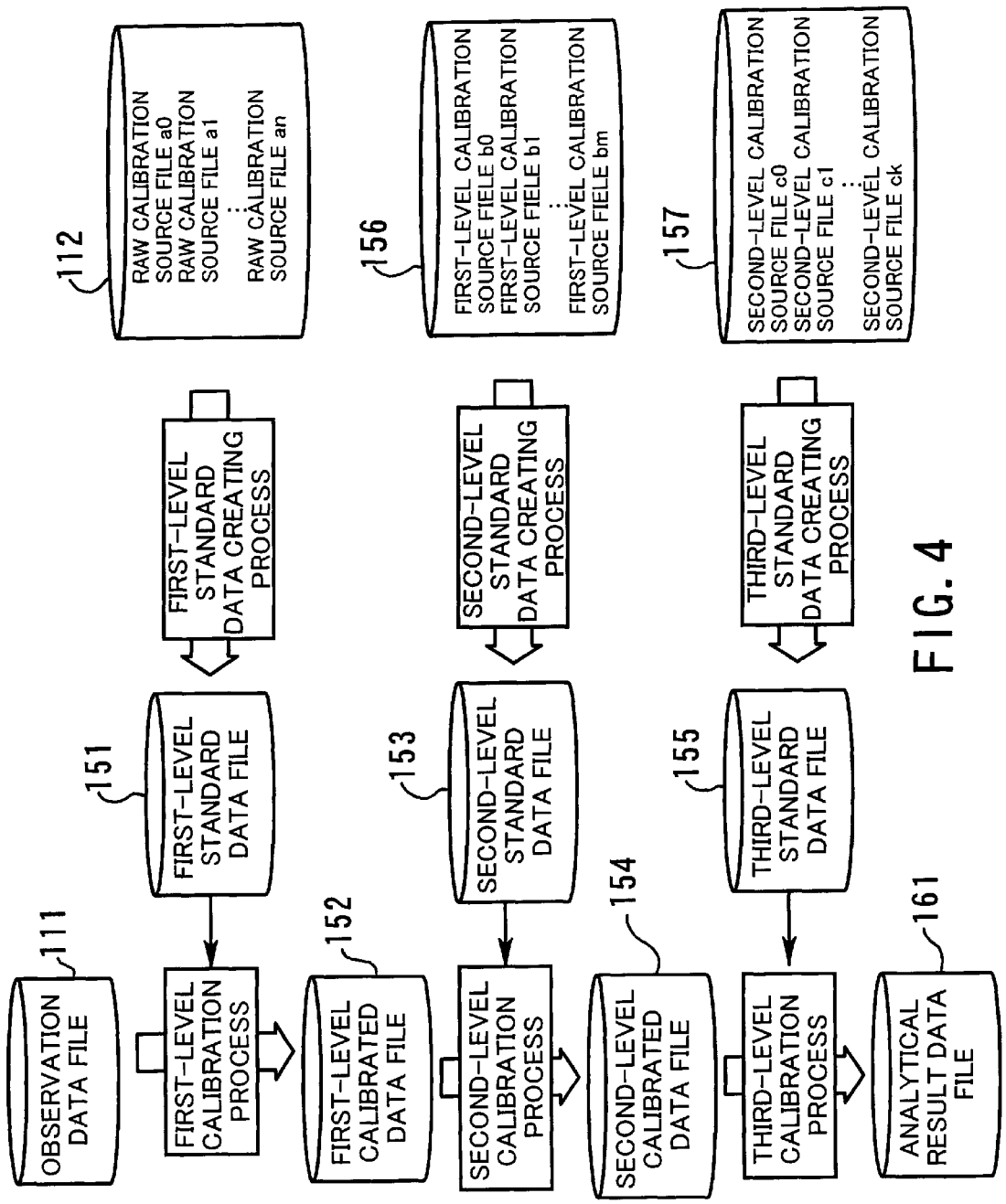
FIG. 4 is a conceptual view of an analytical procedure.

FIG. 4 schematically shows a data flow in a three-level data calibration process, in which an observation data file 111 is manipulated through first-, second-, and third-level calibration processes to yield a fully calibrated outcome, or an analytical result data file 161.

A first-level standard data file 151 is used in the first-level calibration process to calibrate the observation data file 111, resulting in a first-level calibrated data file 152. This data file 152 is then passed to the second-level calibration process, where a second-level standard data file 153 is applied to obtain a second-level calibrated data file 154. Likewise, the third-level calibration process is executed to further process the second-level calibrated data file 154 with a third-level standard data file 155. The analytical result data file 161 is obtained in this way.

In parallel with the above, another thread of prescribed analytical processing should be carried out to obtain each standard data file. The first-level standard data file 151, for example, is produced from a collection of raw (unprocessed) calibration source files 112 through a separate process, which is shown in FIG. 4 as a first-level standard data creating process. In a similar manner, the second-level standard data 153 is obtained from a plurality of first-level calibration source files 156 through a second-level standard data creating process. Further, the third-level standard data file 155 is created from a plurality of second-level calibration source files 157 through a third-level standard data creating process. Although it is not explicitly shown in FIG. 4, like analytical processes are required to prepare the first-level calibration source files 156 and second-level calibration source files 157. The above-noted procedure can be visualized in a three-dimensional model as will be described in the next section.

Figure 5:
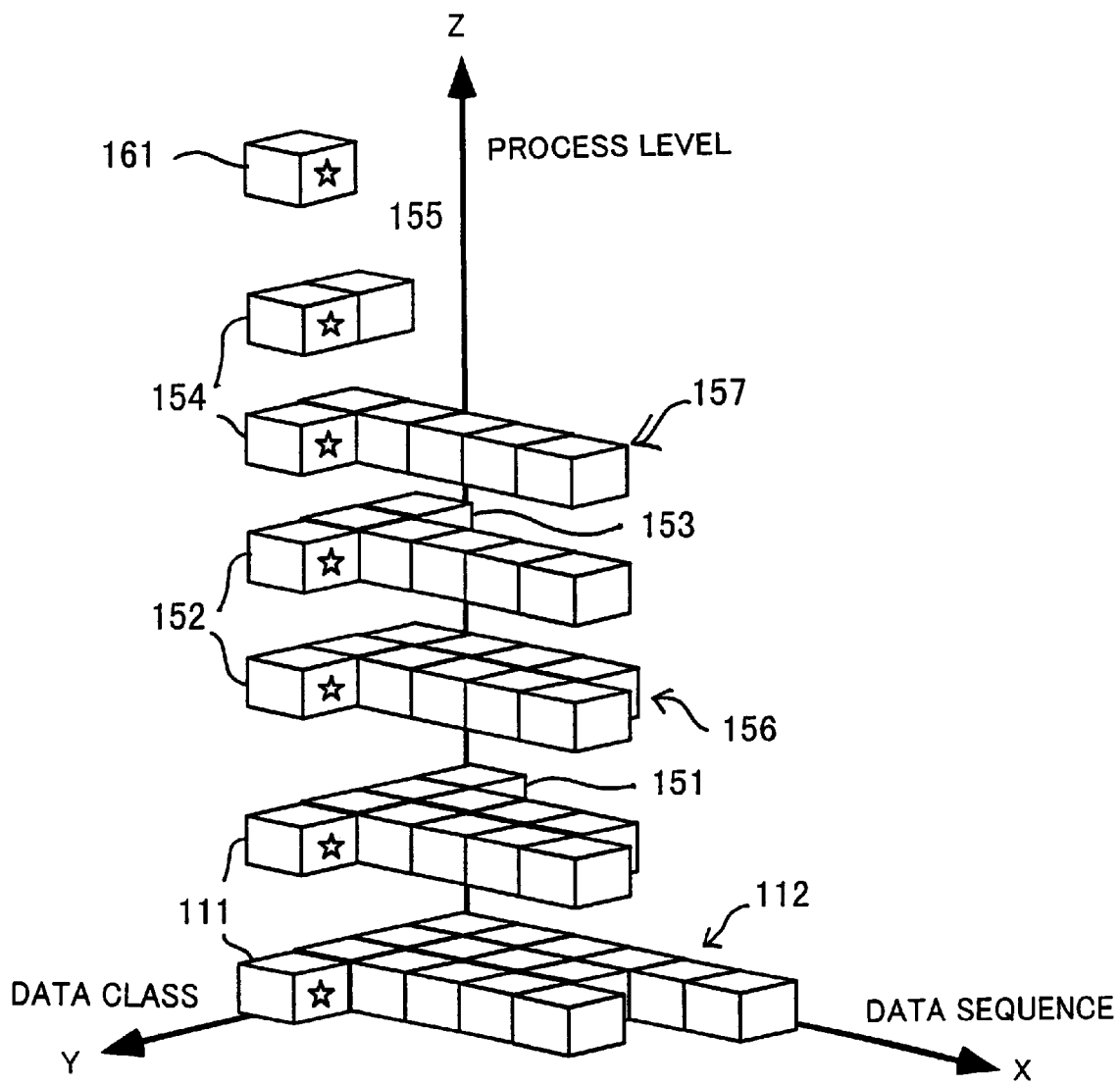
FIG. 5 is a diagram which shows an analytical procedure visualized in a three-dimensional table model.

FIG. 5 shows a three-dimensional table representing the analytical procedure of FIG. 4 discussed above. This three-dimensional table model is defined in a coordinate system (x, y, z), and each individual data file is represented as a cube being positioned in this three-dimensional space. In this model, a series of data files that fall into the same data class are aligned in the x-axis direction, while the y-axis represents different data classes. The z-axis is used to visualize the development of process levels (or steps). More specifically, the process level is incremented each time a data processing operation (e.g., a data calibration process or standard data creating process) is finished.

As mentioned above, data files are classified into several groups according to their contents or roles. Observation data files, for example, belong to a group of source data files. Row calibration source files, together with first-level and second-level calibration source files, would form another group of data files, which are used to create standard data for calibration. The term "data classes" refers to such groups. Each individual data class, or group of data files, is represented in FIG. 5 as a series of cubes aligned in the x-axis direction. By introducing such a multidimensional table model into an analytical procedure script, the relationships among data files can be recognized easily.

In many cases, data files and processing engines are stored in a plurality of computers in a distributed manner. However, conventional computing systems have problems in managing such distributed resource files, as mentioned earlier in this specification. A brief review of this issue will be presented below.

In conventional systems, every data file is identified by using its file name and path name, in conjunction with a node name assigned to the computer that stores it. Such systems allow a plurality of computers to hold two data files sharing the same file and path names, but having completely different contents. This must be a potentially problematic situation. Another problem with the conventional systems is that there have been no universal naming conventions, and what file and path names to use is left to each researcher's choice. This makes it difficult to manage the data files in a unified manner.

The above-noted problems in the prior art can be avoided by employing such a data access method by which one can reach his/her desired data file without the need to specify which computer stores it. That is, it is desirable to introduce a unified naming convention that enables each individual object (i.e., data file or program) to be uniquely identified in a distributed system environment, as well as to develop a framework that provides associations between such names and their corresponding objects. According to the present invention, the following naming convention is proposed so that each data file and each data processing engine will be uniquely identified in the distributed computing system.

******.usr.grp

This name format should be used when naming an analytical process result data file, which is positioned at the top of the aforementioned three-dimensional table model. Here, the first field "****" is any character string that the user can choose, "usr" represents a user name (i.e., who defined this particular data file), "grp" represents a group name (i.e., the name of a group to which the user belongs). Note that the field "****" is only required to be unique among those defined by the same user.

******.usr.grp.cube

The names of analytical procedure scripts should comply with this format.

******.usr.grp.x-y-z

Intermediary data files should be named in this format, where "x," "y," and "z" are coordinate values of a cube in a three-dimensional table model which corresponds to an intermediary data file.

******.usr.grp.engine.version

Processing engines should be named in this way, where "engine" indicates that the file having this name is a processing engine, and "version" (optional) shows its version number.

frame-ID.usr.grp

Image data files should be named in this form, where "frame-ID" is an identification code that is assigned to each image frame captured by the astronomical telescope 11.

In addition to the files noted above, computers in the system are allowed to have local copies of remote data and program files, which are referred to as "cached files" and have the same names as their original files. When a work area is created on a computer, and if the computer lacks some necessary resource files, the missing files are fetched from other computers and saved in the computer's local storage as cached files. Such cached files are stored temporarily and deleted after expiration of a predetermined period. Under the control of the process execution controller 174, cached files are accessible to authorized users in a shared manner. This shared access capability reduces the frequency of file transfer operations, thus alleviating possible increase of network traffic.

The above-described naming convention permits each data or program file to be uniquely identified in a distributed computing environment. The analytical procedure editor 120 (FIG. 2) uses this naming convention to identify each data file or program file appearing in an analytical procedure script being edited.

The next section will show what is described in an analytical procedure script by way of example. FIGS. 6 and 7 show a typical analytical procedure script, which has the following five sections: (a) cube specification, (b) engine specification, (c) data flag, (d) data name, and (e) cube log.

The script begins with information on the script itself, the "cube specification" section, containing the following parameters:

(a1) name

The unique name assigned to the script to distinguish it from others in the distributed data processing system.

(a2) status

The present status of the procedure, which can be expressed as "DSave" when it is saved in storage, "DEdit" when it is updated or newly created, or "DExec" when it is being executed.

(a3) owner

The name of a person who owns this analytical procedure script.

(a4) group

The name of a group to which the owner belongs.

(a5) create_date

Timestamp indicating when the script was created.

(a6) permission

The access rights being granted to the owner, group members, and general users. A string of nine characters (i.e., a combination of characters "-," "r," "w," and "x") provides the following definitions: The first, or leftmost, character shows whether the owner can read this script ("r") or not ("-"). The second character shows whether the owner can modify or write this script ("w") or not ("-"). The third character shows whether the owner can execute this script ("x") or not ("-"). The fourth character shows whether the group members can read this script ("r") or not ("-"). The fifth character shows whether the group members can modify or write this script ("w") or not ("-") The sixth character shows whether the group members can execute this script ("x") or not ("-"). The seventh character shows whether other general users can read this script ("r") or not ("-"). The eighth character shows whether the general users can modify or write this script ("w") or not ("-"). The ninth character shows whether the general users can execute this script ("x") or not ("-"). In the example of FIG. 6, all classes of users (i.e., owner, group members, and general users) are allowed to read, write, and execute the script.

(a7) abstract

Brief description of the analytical process.

(a8) obe

The name of observation equipment used.

(a9) filter

The names of filters used in the observation.

(a10) frame

Type of data obtained as a result of analysis.

(a11) current_step

Current step count of the analysis, indicating which level the present analytical process has reached in a series of process steps, which is represented as a z-axis coordinate in a three-dimensional table model (FIG. 5). The step count is zero before starting the analysis, and incremented by one each time the data files are processed with one data processing engine. That is, the current step count shows how many process steps have finished until now.

(a12) row_num

The number of data classes appearing in the analysis. Here, "row" implies the y-axis direction in the three-dimensional table model of FIG. 5.

(a13) irow_ind

Index number of data class.

(a14) step_num

The number of process steps in the analytical process.

(a15) engine_num

The number of data processing programs involved in the analytical process.

(a16) imagedata_name

The name of a result data file to be created by the analytical process.

The above "cube specification" section is then followed by the "engine specification" section, which contains parameters described below.

(b1) engine_name0

The name of a first data processing engine and arguments given to it.

(b2) engine_attr0

Program type of the first data processing engine, the number of its source data files, and the number of its result data files. Program type is either "Create" or "Apply." "Create" means that the process creates one or more result data files from one or more source data files, while "Apply" means that one result data file is created by applying one or more source data files to one source data file. The number of source data files can be any natural number (1, 2, 3, . . . ). A letter "N," when specified instead of a specific number, denotes that the number of source data files is unknown. This convention also applies to the number of result data files.

(b3) engine_name1

The name of a second data processing engine and arguments given to it.

(b4) engine_attr1

Program type of the second data processing engine, the number of its source data files, and the number of its result data files.

(b5) engine_name2
  The name of a third data processing engine and arguments given to it.
(b6) engine_attr2
  Program type of the third data processing engine, the number of its source data files, and the number of its result data files.
(b7) engine_name3
  The name of a fourth data processing engine and arguments given to it.
(b8) engine_attr3
  Program type of the fourth data processing engine, the number of its source data files, and the number of its result data files. Like parameters would follow this, if the analytical process uses more data processing engines.

The next "data flag" section provides a collection of flags which control the inputs to each data processing engine. Each flag has a value of "0," "1," or "2," depending on the usage of a corresponding data file. More specifically, the value "0" indicates that the data file is not used as a source data file; the value "1" indicates that the data file is a source data file; the value "2" indicates that the data file is used to process other data files with a flag of "1" when the data processing engine has an attribute of "Apply."

The section "data name" provides the names of data files to be used in the present analysis. These file names, determined uniquely in the distributed data processing system, are used in conjunction with the above data flags, permitting each data processing program to identify which data files should be used as its input and result data files.

Lastly, the section "cube log" shows execution log records of each data processing engine.

The following section will now present a more specific example of a distributed data processing system which performs a data analysis by using the above-described analytical procedure script.

Figure 8:
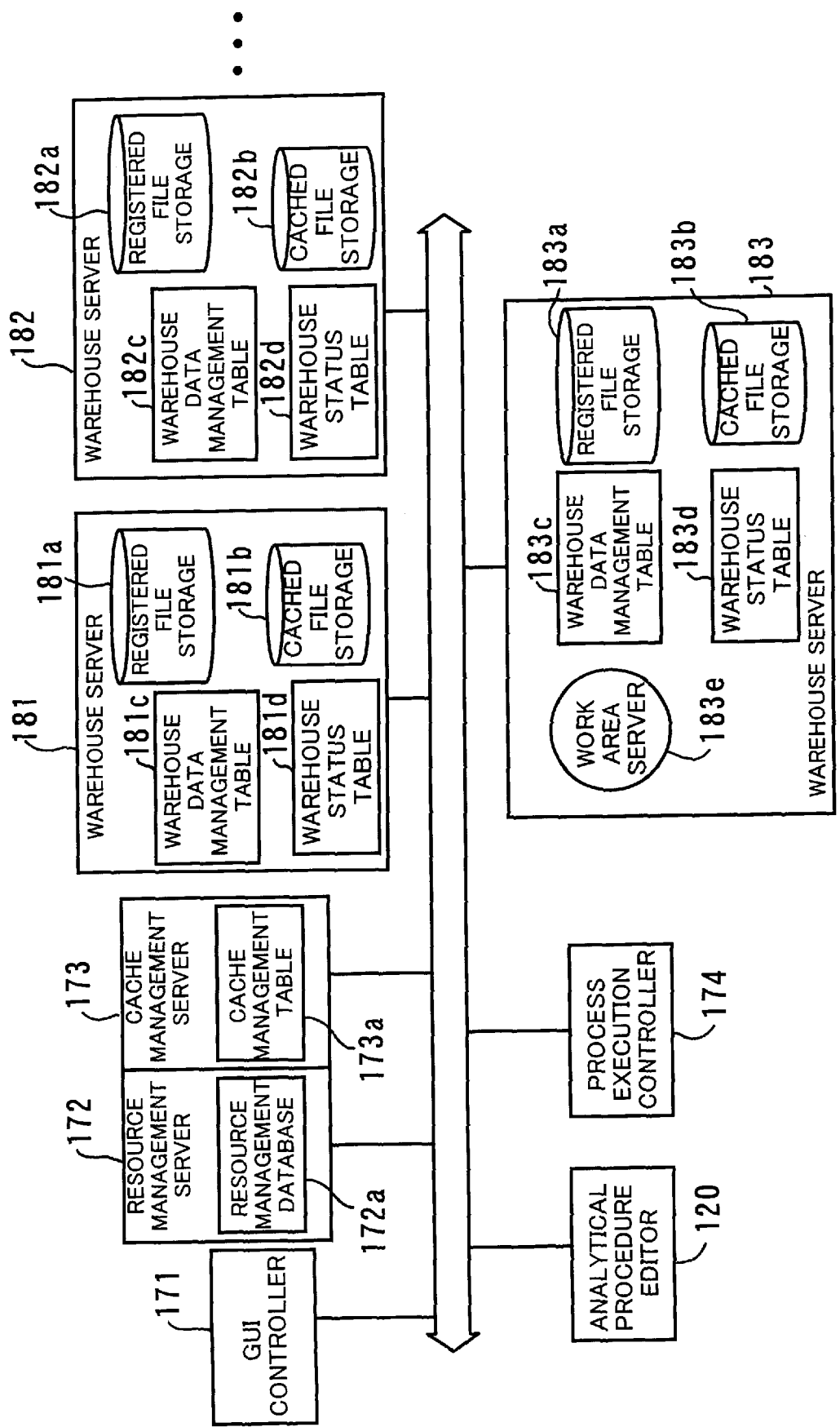
FIG. 8 is a block diagram of a distributed data processing system where various functions are implemented according to the present invention.

FIG. 8 is a functional block diagram of a distributed data processing system. Each terminal station 102 (FIG. 3) has a graphical User Interface (GUI) controller 171 to provide the user with facilities for viewing various system control screens and entering commands to operate the system. With those GUI functions, the user executes an analytical procedure editor 120 to create an analytical procedure script, and requests a process execution controller 174 to execute the script.

There is no need for the user to explicitly specify the locations of necessary resource files to initiate a specific analytical process that he/she desires, since the system employs a resource management server 172 to provide such information. The resource management server 172, which corresponds to the management database storage unit 2 of FIG. 1, has a resource management database 172a to manage the information about which warehouse servers 181 to 183 have what data and program files. Actually, the resource management database 172a is a collection of tables for resource management, including: (a) an analytical procedure management table to manage a plurality of analytical procedure scripts, (b) a processing engine table to manage a plurality of data processing engines, and (c) a source data table to manage a plurality of source data files, including image data files and intermediate data files.

FIG. 9 shows a typical analytical procedure management table 172aa. This table 172aa holds information on all existing analytical procedure scripts in the warehouse servers 181 to 183, whose columns are labeled: "name," "abstract," "owner," "group," "create_date," "imagedata_name," "obe," "frame," "permission," "warehouse_name," and "datatype." Most of those data items, except for the last two, have been explained earlier in this specification. The column "warehouse_name" shows at which warehouse server each analytical procedure script is stored. In the table 172aa of FIG. 9, the rightmost column "datatype" is filled with strings "PROCEDURE," which indicates that all entries in this table are analytical procedure scripts.

FIG. 10 shows a typical processing engine management table 172ab. This table 172ab holds information on all data processing engines existing in the warehouse servers 181 to 183, whose columns are labeled: "name," "abstract," "arg," "owner," "group," "create_date," "permission," "warehouse_name," and "datatype." While most of those data items are the same as those in the analytical procedure management table 172aa, text strings "ENGINE" found in the rightmost column "datatype" indicate that the files listed in this table are data processing engines. Further, the third column named "arg" shows arguments to be given to each data processing engine when it is executed.

FIG. 11 shows a typical source data management table 172ac, which holds the information on all source data files stored in the warehouse servers 181 to 183. Its columns are labeled: "name," "abstract," "frame," "owner," "group," "create_date," "procube_name," "permission," "warehouse_name," and "datatype." While most of the data items are the same as those in the analytical procedure management table 172aa, text strings "IMAGEDATA" found in the rightmost column "datatype" mean that the files listed in this table are source data files. The sixth column titled "procube_name" shows the names of analytical procedure scripts corresponding to the individual source data files.

The process execution controller 174 requests the resource management server 172 to send the location of a particular analytical procedure script. Upon receipt of this request, the resource management server 172 consults the above-described resource management database 172a to find a "warehouse_name" associated with the "name" of the script. It then responds to the request by informing the process execution controller 174 of the name of the warehouse server found.

Figure 12:
FIG. 12 is a diagram which shows an example of a cache management table.

Referring back to FIG. 8, the cache management server 173 has a cache management table 173a to manage the locations of cached data files. That is, it manages the information about which data files are cached in which warehouse servers. FIG. 12 shows a typical cache management table 173a, which has three columns titled "name," "create_date," and "warehouse_name" to describe what data files are stored in the warehouse servers 181 to 183. More specifically, the first column "name" is used to store the names of data files that are copied from their original locations and stored and used locally. The names of such cached data files are identical with those of their original files, and thus they are unique in the distributed data processing system. The second column "create_date" indicates the date and time when each cached data file was created. The third column "warehouse_name" shows the name of a warehouse server where each cached data file is stored.

Referring again to FIG. 8, suppose that the user has entered an execution request command specifying a particular analytical procedure script. Upon receipt of this command, the process execution controller 174 establishes a program execution environment to start the requested analytical process. For example, it selects an appropriate warehouse server for the analysis and requests the selected server to execute relevant programs.

The warehouse servers 181 to 183 are designed to serve as warehouses that store data and program files necessary for various analytical processes. Their storage facilities are divided into two groups: registered file storage 181a, 182a, and 183a and cached file storage 181b, 182b, and 183b. The registered file storage 181a, 182a, and 183a is used to store analytical procedure scripts, image data files, intermediate data files, analytical result data files, and processing engines. In contrast, the cached file storage 181b, for instance, is used to store their replicas that the warehouse server 181 obtained from other warehouse servers 182 and 183. The cached file storage 182b in the warehouse server 182 stores data and program files copied from other servers 181 and 183. Likewise, the cached file storage 183b in the warehouse server 183 stores data and program files copied from other servers 181 and 182.

The warehouse servers 181 to 183 also have their respective warehouse data management tables 181c, 182c, and 183c, as well as warehouse status tables 181d, 182d, and 183d. FIG. 13 shows an example of a warehouse data management table. To store the information on the registered file storage 181a and cached file storage 181b, this warehouse data management table 181c has a plurality of columns labeled as: "status," "name," "abstract," "owner," "group," "permission," "create_date," "last_access_time," "caching time," "path," "arg," "obe," and "frame." Most of these columns are used similarly to other tables described earlier, except for the following ones. The leftmost column "status" indicates what types of data or program files are stored in the server, where "engine" means that the files are computer programs of processing engines, "image" means that the files are image data files, and "procedure" means that the files are analytical procedure scripts. The eighth column "last_access_time" stores timestamps to record the latest access to each file. The next column "caching_time" is used to record the time when the file is cached. The next column "path" indicates a full path name (i.e., path from the root directory of the computer) of each file.

FIG. 14 shows an example of the warehouse status table. To record an operational history of the warehouse server 181, this warehouse status table 181d has five columns titled "time," "available work area," "usage ratio," "CPU load," and "network load." The first column titled "time" shows when each record is made. The second column "available work area" indicates how much unused storage space is left in the warehouse server 181's local hard drive, for use as work areas. The third column "usage ratio" shows the occupancy of the work area in terms of usage ratios to its total size. The fourth column "CPU load" indicates the load imposed on the central processing unit (CPU) of the warehouse server 181. The rightmost column "network load" shows the usage of network facilities when the warehouse server 181 communicates with other computers.

The elements shown in FIG. 8 can communicate with each other through common services designed for distributed object environments, such as the Common Object Request Broker Architecture (CORBA). When a work area set-up request is received from the process execution controller 174, the recipient warehouse server constructs a work area in its local storage space, and activates a work area server 183e. This is a preparatory process for data analysis. The next few sections will describe such a process flow of analysis in the proposed distributed data processing system, with reference to some flowcharts, and in the order of step numbers shown in the flowcharts.

Figure 15:
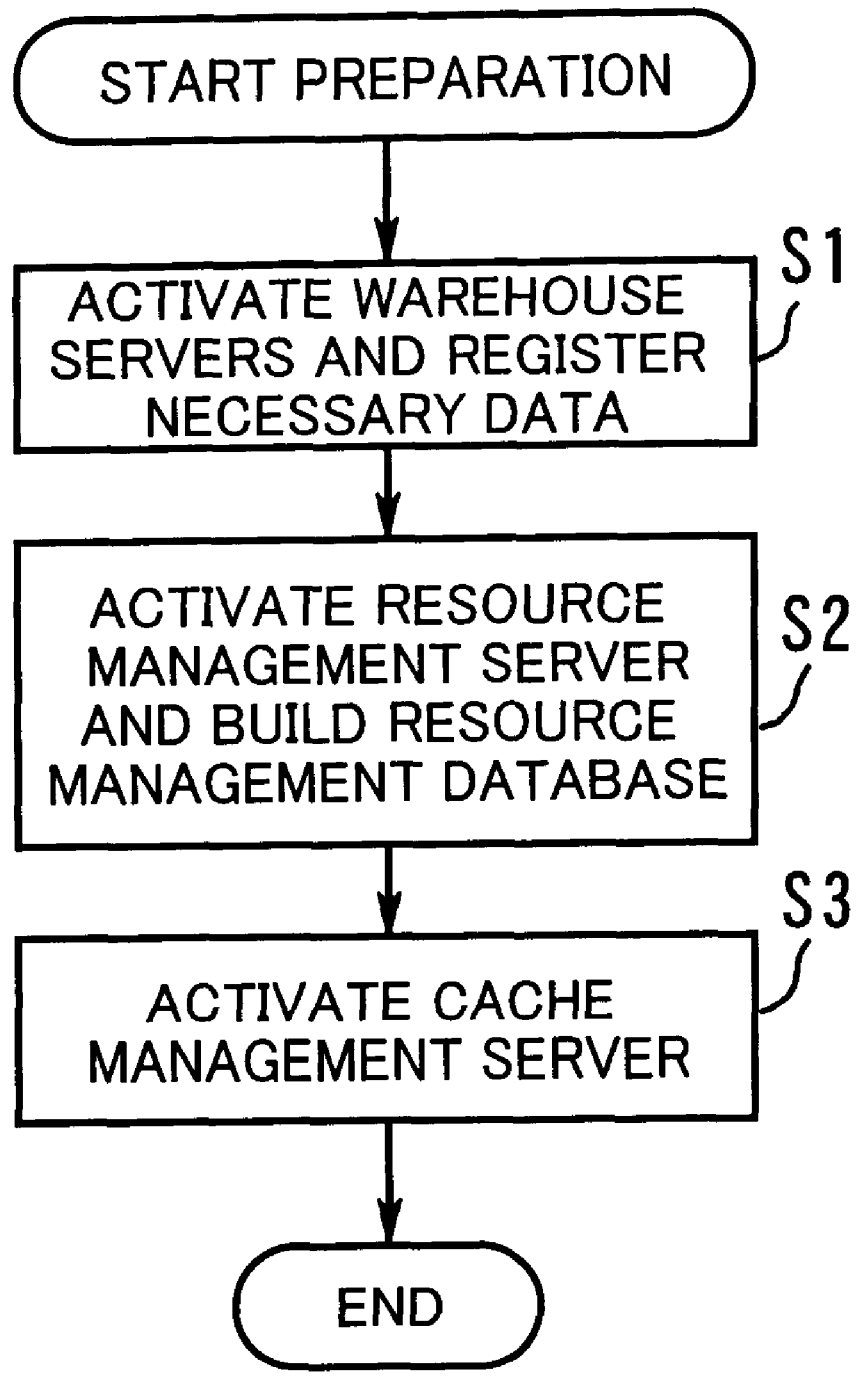
FIG. 15 is a flowchart which shows how to make a necessary setup for execution of a specific analytical process.

FIG. 15 is a flowchart which shows how to set up necessary functions to prepare for a specific analytical process. The user initiates this preparatory process by entering an appropriate command to the process execution controller 174 through the GUI controller 171.

(S1) The process execution controller 174 activates warehouse servers 181 to 183, disposed in the plurality of computers, and registers various data to them. After that, the warehouse servers 181 to 183 manage the registered data.

(S2) The process execution controller 174 activates the resource management server 172 to collect and record information about what the warehouse servers 181 to 183 have in their respective local storage.

(S3) The process execution controller 174 then activates the cache management server 173. Note that there are no cached files at the initial stage. Each time a cached file is created in the warehouse servers 181 to 183, the cache management server 173 updates its cache management table 173a for further management.

Figure 16:
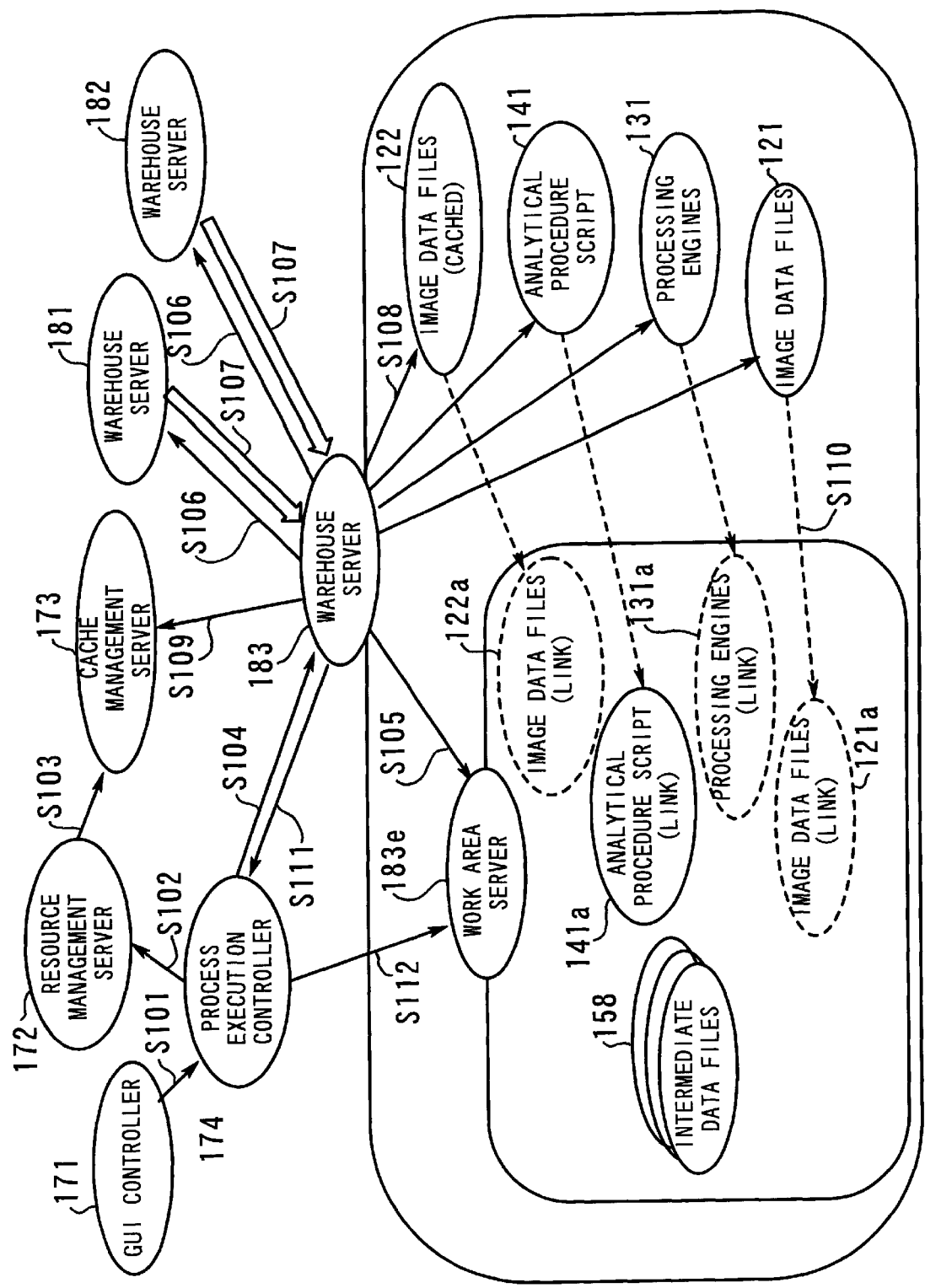
FIG. 16 is a diagram which schematically shows how an analytical process is executed.
Figure 17:
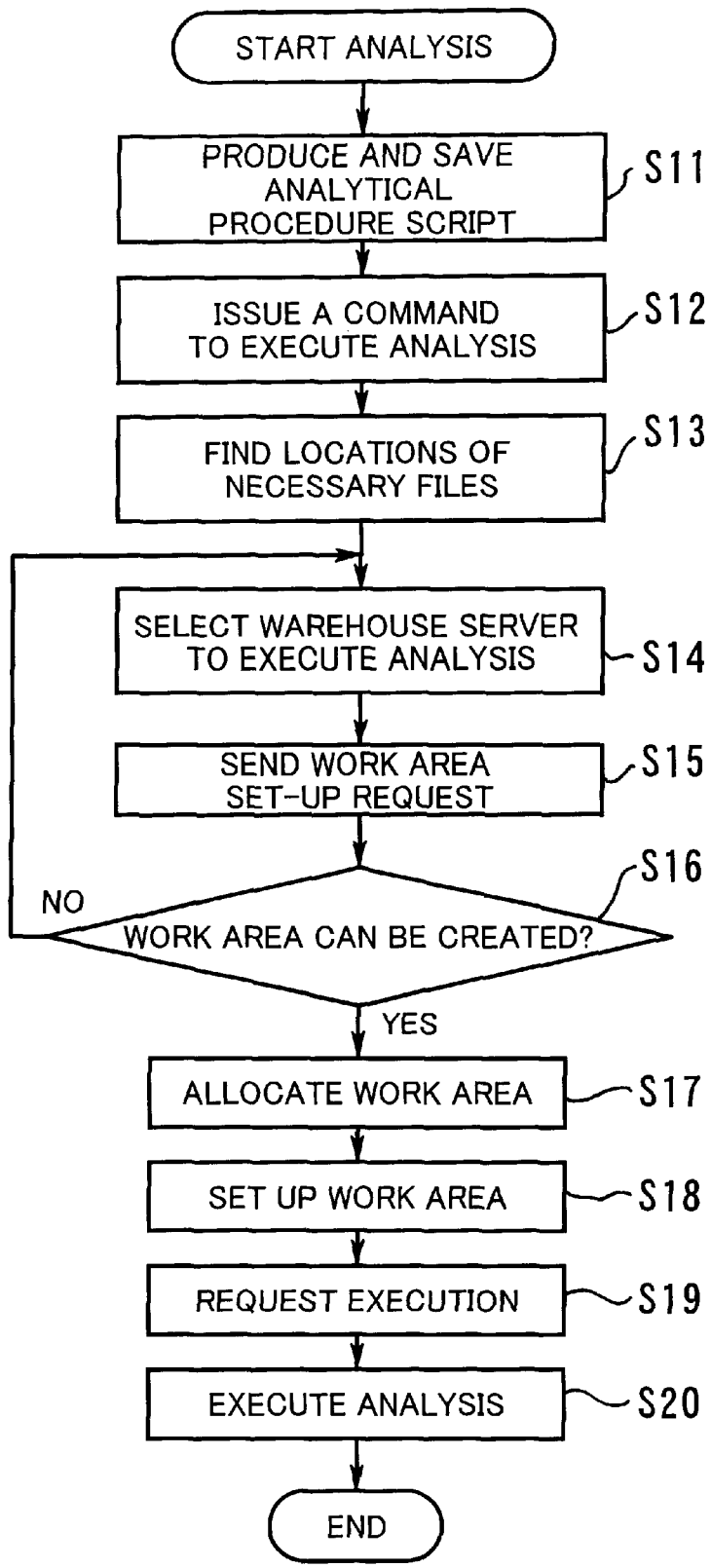
FIG. 17 is a flowchart which shows how to execute an analytical process.

Since the above steps S1 to S3 establish a program execution environment, the user can now start an analytical process that he/she desires. FIG. 16 schematically shows how this analytical process is executed, and FIG. 17 is a flowchart of the same. The following section will now explain each step of this process flow, referring also to FIG. 16.

(S11) The user activates an analytical procedure editor to create an analytical procedure script. The created script is then stored in one of the warehouse servers.

(S12) Through the GUI controller 171, the user commands the process execution controller 174 to start the analysis, specifying the name of the created analytical procedure script (S101, FIG. 16).

(S13) The process execution controller 174 first sends a query to the resource management server 172 to ask which warehouse server has the specified analytical procedure script. When the reply message is received, it makes access to the relevant warehouse server, thereby fetching the analytical procedure script being demanded. The process execution controller 174 parses the script to identify what source data files and processing engines are necessary for the analysis. To obtain the storage locations of those files, it sends another query again to the resource management server 172 (S102, FIG. 16).

In addition to finding relevant warehouse servers that store the required source data files and processing engines, the resource management server 172 sends a query to the cache management server 173 to ask where the source data files and processing engines are being cached (S103, FIG. 16). The cache management server 173 responds to this query by naming relevant warehouse servers, if any, that have those files in their cached file storage. Note here that, if a plurality of warehouse servers have them, the cache management server 173 returns a list of all such servers. The resource management server 172 updates its local database with the response from the cache management server 173, and also responds to the query from the process execution controller 174.

(S14) The process execution controller 174 now determines which warehouse server should execute the analysis (details of this selection will be described later). Suppose here that it has selected the warehouse server 183 which has all necessary files, i.e., analytical procedure script 141, processing engines 131, and image data files 121.

(S15) The process execution controller 174 requests the selected warehouse server 183 to create a work area for use in the analysis (S104, FIG. 16). It also informs the warehouse server 183 of the location of relevant source data files.

(S16) Upon receipt of this work area set-up request, the warehouse server 183 checks whether the requested work area can be created. If it can be created, the process advances to Step S17. If not, the process returns to Step S14 to seek another appropriate server.

(S17) The warehouse server 183 makes a directory, or folder, for use as a work area corresponding to the analytical procedure script. The warehouse server 183 is now responsible for managing the name and path of that work area directory. The warehouse server 183 activates and initializes its work area server 183e, which proceeds the analysis by using the newly created directory (S105, FIG. 16).

(S18) The warehouse server 183 sets up the work area. More specifically, the warehouse server 183 first checks whether there are any source data files or processing engines that are missing in its local storage. If some files are missing, the warehouse server 183 requests other servers 181 and 182 to provide them (S106, FIG. 16). It may also request analytical procedure scripts, if necessary. The warehouse servers 181 and 182 then provide the requested data files and/or program files (S107, FIG. 16). The warehouse server 183 saves the received files into its cached file storage (S108, FIG. 16). In the present example of FIG. 16, some image data files 122 are cached in the warehouse server 183. Since its cache status has changed, the warehouse server 183 must inform the cache management server 173 of the new entries (S109, FIG. 16). Upon receipt of this information, the cache management server 173 updates its cache management table 173a by recording the names of the cached files, along with the name of the warehouse server 183. The warehouse server 183 then defines some links in the work area by using link commands of the UNIX operating system, so that they will point at the source data files and processing engines to be used in the analysis (S110, FIG. 16). Those links can be identified uniquely in the system. In the present example of FIG. 16, links 121a, 122a, 131a, and 141a are created in the work area, which are associated with the substantial data and program files 121, 122, 131, and 141, respectively. Now that the work area is ready to use, the warehouse server 183 notifies the process execution controller 174 of the completion of the work area server 183e, as a reply message to the work area set-up request (S111, FIG. 16).

(S19) Receiving this notification from the warehouse server 183, the process execution controller 174 requests the work area server 183c to execute the analysis (S112, FIG. 16).

(S20) The work area server 183e reads the analytical procedure script 141a in the work area directory, and it executes the requested analytical procedure by using the image data files 121a and 122a and processing engines 131a in the same directory. Several intermediate data files 158 may be produced during the execution. The work area server 183e continues the analysis with the processing engines 131a, reading those intermediate data files 158. All those intermediate data files 158 are created in the work area directory and named in accordance with the analytical procedure script for the sake of future access or reference.

Figure 18:
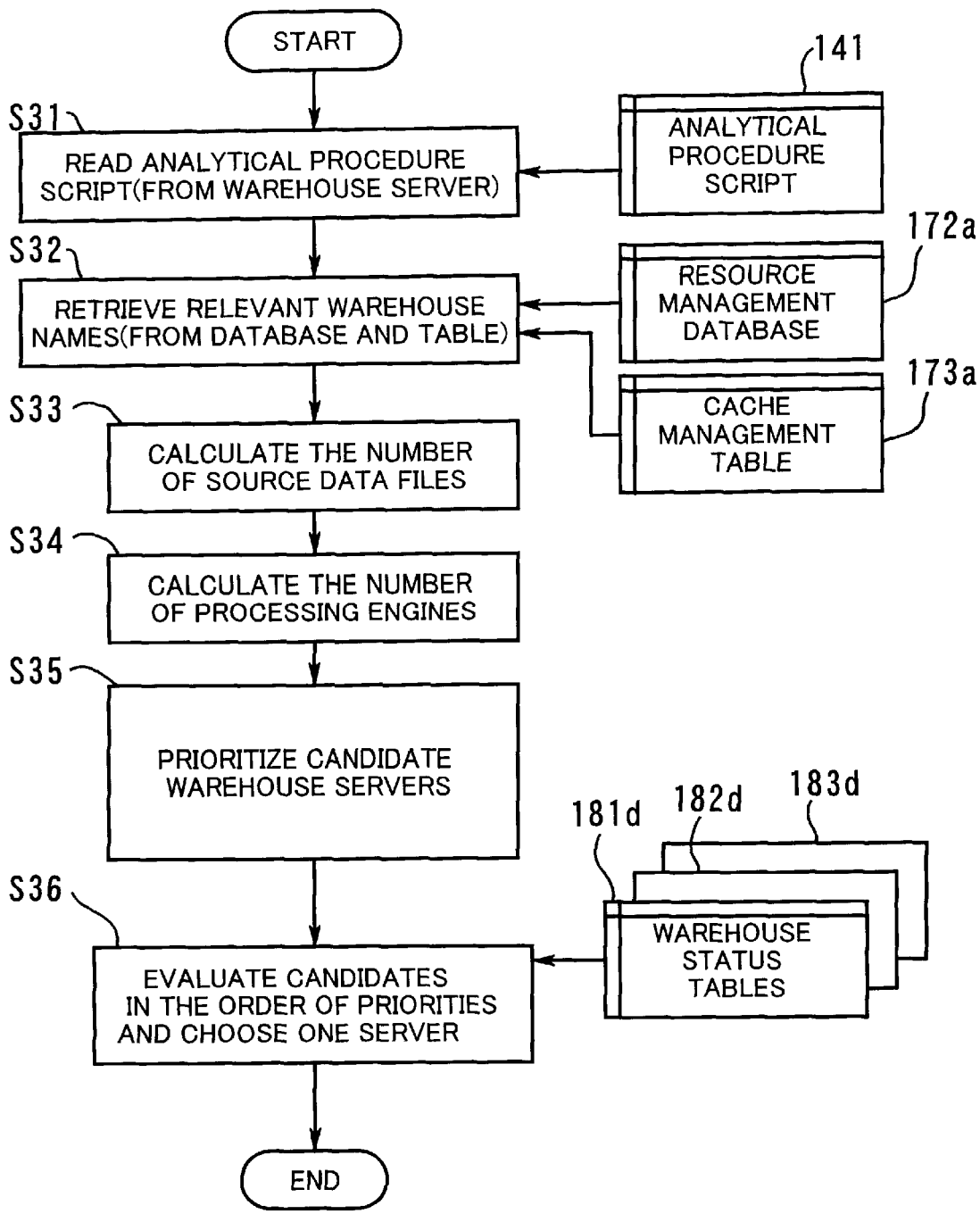
FIG. 18 is a flowchart of a process to determine which warehouse server to use.

FIG. 18 is a flowchart of a process executed by the process execution controller 174 to determine which warehouse server should execute the analysis.

(S31) The process execution controller 174 reads and parses the analytical procedure script 141.

(S32) The process execution controller 174 searches the resource management database 172a in the resource management server 172, as well as the cache management table 173a in the cache management server 173, thereby finding warehouse servers which have all or part of required source data files and processing engines. Suppose here that the warehouse servers 181 to 183 are named as candidates that are potentially suitable for the requested analysis.

(S33) The process execution controller 174 calculates the number of source data files stored in each candidate.

(S34) The process execution controller 174 calculates the number of processing engines stored in each candidate.

(S35) The process execution controller 174 prioritizes the candidates on the basis of the following criteria.

Have the most source data files

Have a level-0 processing engine that is required in the very first process step in the analysis Have a series of processing engines that can be executed consecutively If there are candidates satisfying the above criteria, the process execution controller 174 will give high priorities to them when making a selection in the next step.

(S36) Referring to the warehouse status tables 181d, 182d, and 183d in the respective warehouse servers, the process execution controller 174 chooses one of the candidates by evaluating them under the following criteria, taking the above-noted priorities into consideration.

Have enough disk space

Have enough processing performance (i.e., present CPU load is low)

Have enough networking performance (i.e., present network load is low)

Figure 19:
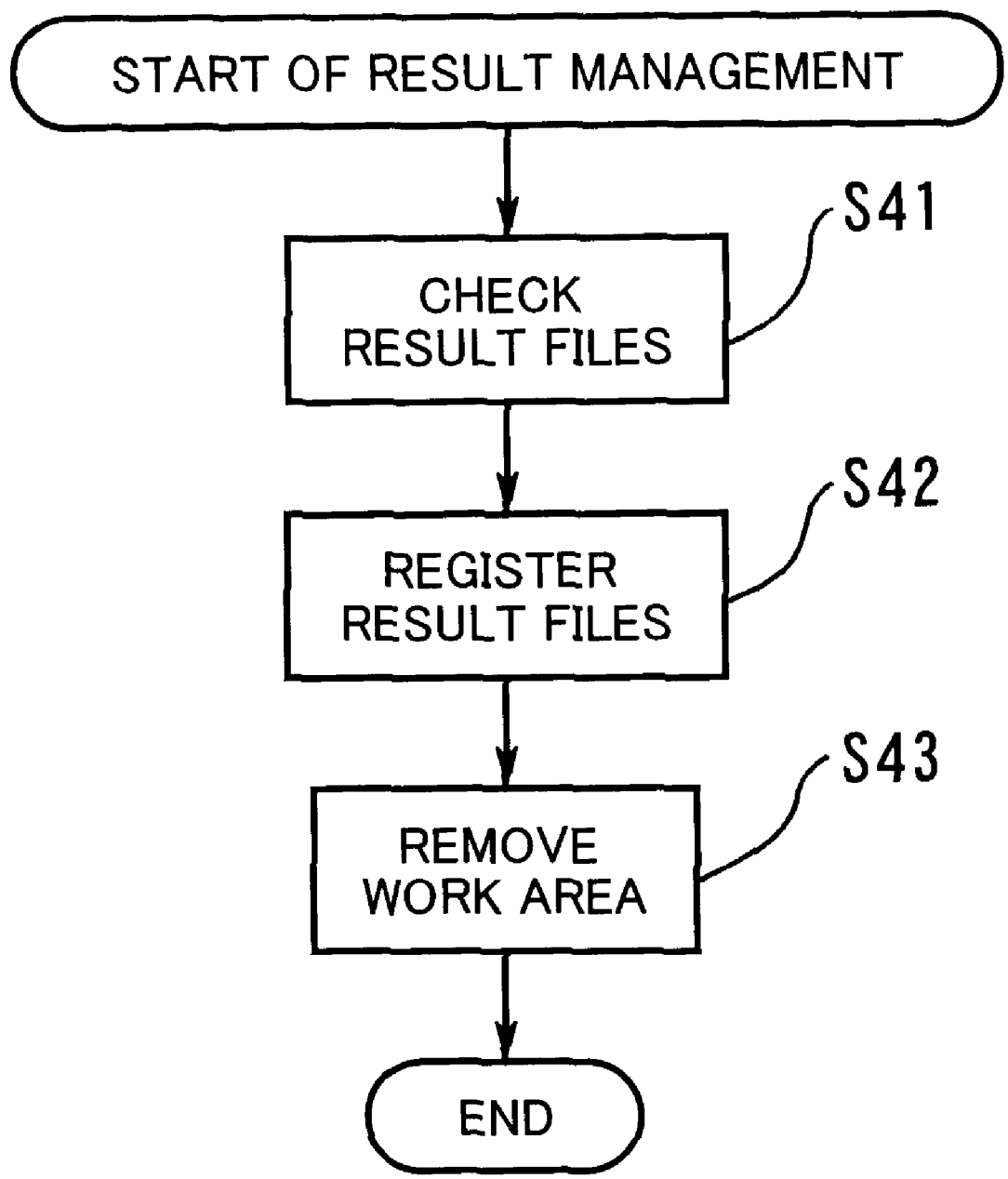
FIG. 19 is a flowchart of a process to manage execution results.

Referring now to a flowchart of FIG. 19, the next section will describe a process of managing analytical results.

(S41) The user checks the result data files and intermediate data files created as a result of execution. To this end, the user opens the analytical procedure script 141 on the analytical procedure editor 120, and selects the intermediate data files 158 on the editor screen.

(S42) The user save some of the intermediate data files, if necessary. More specifically, the user picks up necessary intermediate data files on the editor screen and moves them to the registered file storage of the warehouse server.

(S43) The user deletes the work area. That is, the user directs the warehouse server 183 to delete the work area directory, thereby removing all intermediate data files, including those that have become obsolete as a result of the registration. In case the analysis has failed for any reason, it would probably leave some useless files in the work area. The above directory deletion will also sweep out such garbage.

As described above, the proposed distributed data processing system is configured to have a virtual work area on one of the computers, and to use this work area to create such objects that link with source data files, processing engines, and analytical procedure scripts in a symbolic manner by using "link" commands of the UNIX operating system. The requested process can be executed by using this work area, together with relevant file names described in an analytical procedure script.

Intermediate data files are created during the analysis, primarily as temporary files being named according to the analytical procedure script. If required, such intermediate data files can be entirely deleted by simply removing a relevant work area, since their locations are strictly confined within the work area. Recall that every work area contains links to related source data files, processing engines, and analytical procedure scripts. Although the removal of a work area implies the erasure of such links, it will never affect the substance of those files.

It is a basic rule that one work area is created for one analytical procedure script. Their one-to-one correspondence permits the user to delete all unnecessary data elements in a particular analytical process by discarding a relevant work area.

Data and program files in the distributed system can be the subject of search operations, because they have unique names to distinguish themselves from each other. This file search function is implemented as part of an analytical procedure editor as will be described later.

The following section will now explain the operation of the analytical procedure editor 120.

Figure 20:
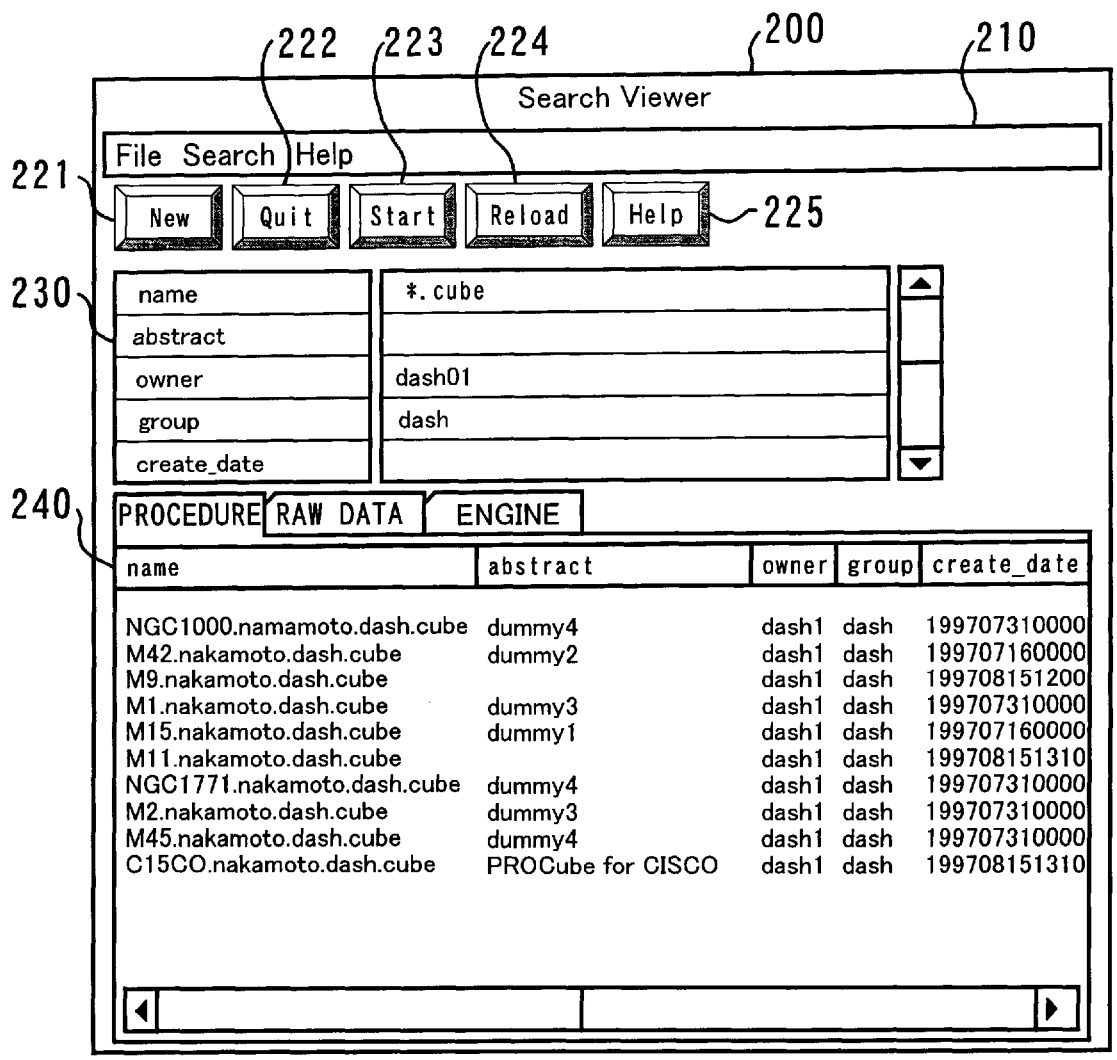
FIG. 20 is a diagram which shows a data search window implemented as part of an analytical procedure editor.

FIG. 20 shows a data search window implemented as part of the analytical procedure editor 120. A menu bar 210 is employed on top of this data search window 200 to allow the user to issue some commands to the system. Several buttons 221 to 225 are placed under the menu bar 210 to provide functions described below. "New" button 221 clears current search data and initializes the data search window 200, when it is pressed. "Quit" button 222 is used to close the window 200. "Start" button causes the system to start searching for files. "Reload" button 224 directs the system to load and display the files listed in search result tabs 240. "Help" button 225 is used to view an online document that describes how to make a search.

The window 200 has a search keyword field 230 to allow the user to enter his/her desired search keywords for different file properties. For example, the user can specify a keyword for each individual property such as "name" or "abstract." The system implicitly applies logical AND operators to those multiple search keywords; that is, the system retrieves data and program files that meet all the search criteria specified by the user. When the search is completed, the names and properties of retrieved files are listed on the search result tabs 240. The user can select necessary files from among those listed in the search result tabs 240 and call up them on an edit window of the analytical procedure editor as will be described in the next section.

Figure 21:
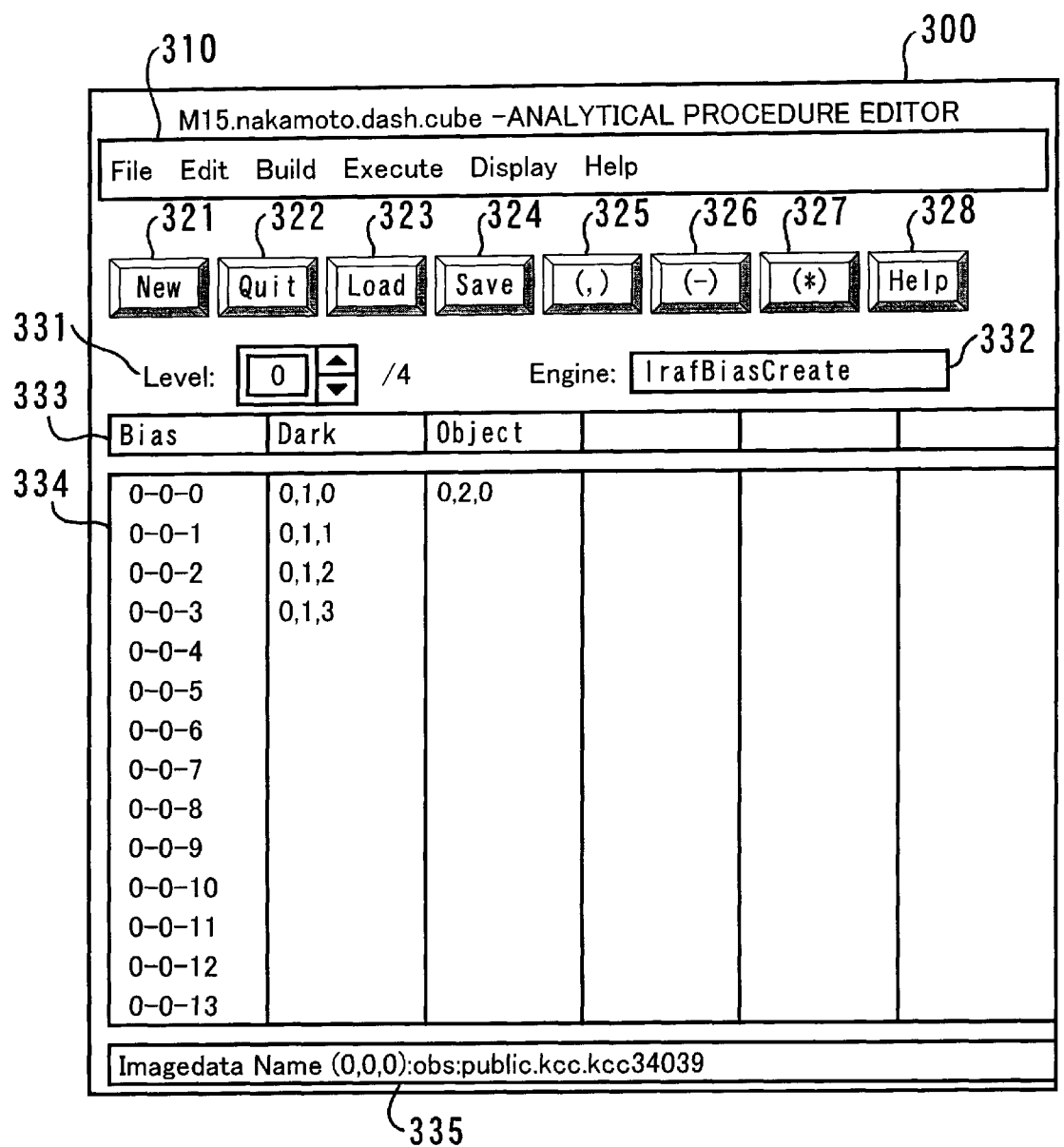
FIG. 21 is a diagram which shows a data edit window implemented as part of the analytical procedure editor.

FIG. 21 shows a data edit window implemented as part of the analytical procedure editor. This data edit window 300 has a menu bar 310 to allow the user to choose a menu command. For example, "Execute" command is used to issue a process execution request to the process execution controller 174 so that the analytical procedure being edited on the window 300 will be executed.

A plurality of buttons 321 to 328 are placed under the menu bar 310 to provide functions described below. "New" button 321 initializes the data edit window 300, when it is pressed. "Quit" button 322 is used to close the window 300. "Load" button 323 directs the system to load an analytical procedure script to a memory space accessible to the analytical procedure editor; the contents of the script is presented to the user, being rearranged in a predetermined field format of the data edit window 300. "Save" button 324 causes the system to save the edited data into storage such as a hard disk unit. "(,)" button 325 is used to invalidate the currently selected data file not to be subjected to data processing programs. "(-)" button 326, in turn, specifies the selected data file as the subject of execution. "(*)" button 327 allows the user to cause the selected data file to serve as an operator to other source data files. Standard data files for calibration are an example of this type. "Help" button 328 presents the user an online document that describes how to use the data edit screen.

A spin box 331 named "Level" is used to select a particular process level (see FIG. 5) to allow the system to extract relevant data files and displays them in a data listing area 334. A text box 332 with a label "Engine" allows the user to enter the name of a data processing program that produces new dataset from the output of the present step. A data class field 333 indicates the name of each column of the data listing area 334. For example, the column under the label "Bias" contains data for bias correction. In the present example of FIG. 21, the data listing area 334 represents source data as coordinate values in a three-dimensional table model of FIG. 5. A data file name field 335 shows the name of the data file being displayed on the data listing area 334. When an analytical procedure is produced on this data edit window 300, the user issues an "Execute" command on the menu bar 310 to call up a process execution dialog.

Figure 22:
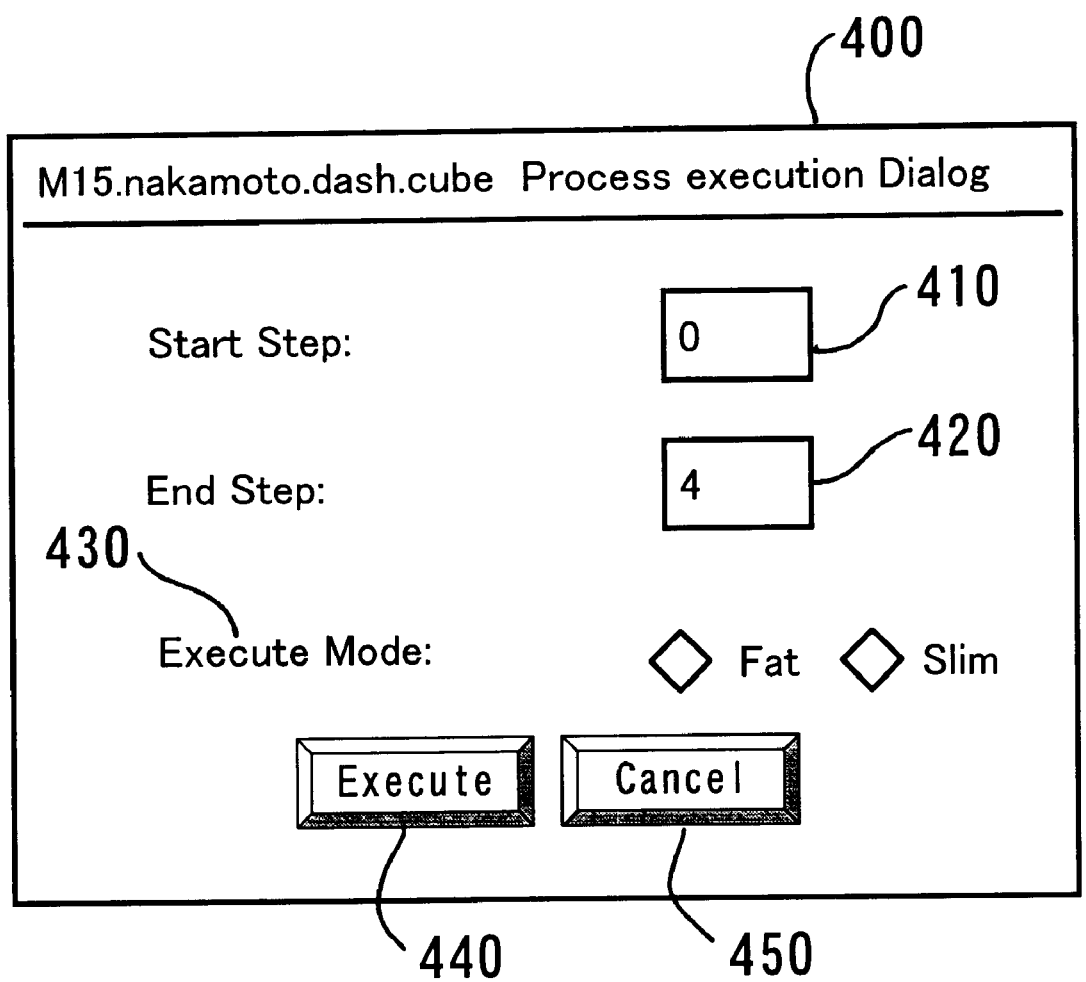
FIG. 22 is a diagram which shows a dialog to specify the details of process execution.

FIG. 22 shows a process execution dialog 400. This dialog 400 has a "Start Step" box 410 and an "End Step" box 420, enabling the user to specify his/her desired starting step number and ending step number, respectively. The user is also allowed to choose a preferable execution mode by clicking mode option buttons 430. This mode selection affects the precision and other parameters pertaining to the analysis. The process execution dialog 400 has two buttons 440 and 450 at its bottom portion. "Execute" button 440, when it is pressed, triggers the execution of an analytical process, while "Cancel" button 450 is used to abort it.

The above-described user interface facilities in the proposed distributed data processing system permits the user to define an analytical procedure and execute the desired analysis according to the analytical procedure defined. What is important to note here is that the user can make it without being aware that data and program files are distributed over a plurality of processors. It should also be noted that the system allows an interrupted process to resume on a different computer, because all resource files required in an analytical process can be uniquely identified in the distributed data processing system. This is accomplished by moving the work area of the interrupted process to another computer and restarting the process at the new location. The process execution controller is designed to automatically control analytical processes as such. Suppose, for example, that an ongoing analytical process is interrupted, but the computer is unable to resume the process, because the processor load has increased during the interruption. In such a case, the process execution controller will find another appropriate computer and direct the new computer to take over the interrupted process. This switching process from one computer to another computer may not necessarily be visible to the user.

The proposed processing mechanisms are actually implemented as software functions of a computer system. Process steps of the proposed distributed data processing system are encoded in a computer program, which is to be stored in a computer-readable storage medium. The computer system executes this program to provide intended functions of the present invention. Suitable computer-readable storage media include magnetic storage media and solid state memory devices. Some portable storage media, such as CD-ROMs and floppy disks, are particularly suitable for circulation purposes. It is also possible to distribute programs through an appropriate server computer deployed on a network. Program files delivered to a user are normally installed in his/her computer's hard drive or other local mass storage devices, so that they will be executed after being loaded to the main memory.

The above discussion will now be summarized as follows. The distributed data processing system of the present invention has a resource management database that associates the names of resource files with their respective storage locations, so that the resource files can be uniquely identified and located in a distributed environment. The process execution unit is designed to consult the resource management database to collect necessary resource files. Accordingly, to initiate an analytical process, the user has only to issue a process execution request that specifies the names of required resource files, without the need to know their actual storage locations.

Furthermore, the present invention provides a computer-readable medium storing a computer program that is designed for distributed data processing. This computer program uses a resource management database to manage the associations between the names of resource files and their actual storage locations, where individual resource files are fully identifiable, thanks to the uniqueness of their names in the system. The program is designed to consult the resource management database to collect necessary resource files. Computers execute the program to provide intended functions and services of a distributed data process system according to the present invention.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A distributed data processing system for analyzing data with a plurality of computers in a distributed environment, comprising:

management database storage means for storing a resource management database that associates identifiers of resource files, which are data and/or program files, for analytical processes with actual storage locations of the resource files, the identifiers being determined to identify the resource files uniquely in the distributed data processing system; and process execution means, responsive to a request for execution of a specific analytical process whose necessary resource files are identified by one of the identifiers, for selecting a computer that ranks first in terms of the number of necessary resource files stored therein and executing on the selected computer the requested analytical process by using the resource files whose storage locations are retrieved from the resource management database in said management database storage means.

2. A distributed data processing system for analyzing data with a plurality of computers in a distributed environment, comprising:

management database storage means for storing a resource management database that associates identifiers of resource files, which are data and/or program files, for analytical processes with actual storage locations of the resource files, the identifiers being determined to identify the resource files uniquely in the distributed data processing system; and cache management table storage means for storing a cache management table to collect records of cached resource files that have been fetched from remote computers and stored temporarily; and process execution means, responsive to a request for execution of a specific analytical process whose necessary resource files are identified by one of the identifiers, for selecting a computer that ranks first in terms of the number of necessary resource files stored therein by examining the resource management database and the cache management table, and executing on the selected computer the requested analytical process by using the resource files whose storage locations are retrieved from the resource management database in said management database storage means.

* * * * *